(12) United States Patent
Ulcej et al.

(10) Patent No.: US 6,682,333 B2
(45) Date of Patent: Jan. 27, 2004

(54) QUICK-RELEASE EXTRUSION DIE

(75) Inventors: John A. Ulcej, Colfax, WI (US); Dale P. Pitsch, Jim Falls, WI (US); Jeffrey J. Steltz, Chippewa Falls, WI (US)

(73) Assignee: Extrusion Dies Industries LLC, Chippewa Falls, WI (US)

( * ) Notice: Subject to any disclaimer, the term of this patent is extended or adjusted under 35 U.S.C. 154(b) by 0 days.

(21) Appl. No.: 09/998,818

(22) Filed: Oct. 25, 2001

(65) Prior Publication Data

US 2003/0082256 A1 May 1, 2003

(51) Int. Cl.⁷ .............................................. B29C 47/14
(52) U.S. Cl. ................ 425/186; 425/192 R; 425/376.1; 425/461
(58) Field of Search ........................ 425/62, 186, 190, 425/192 R, 376.1, 461, 188

(56) References Cited

U.S. PATENT DOCUMENTS

| | | | |
|---|---|---|---|
| 3,930,778 A | 1/1976 | Roncelli | 425/192 |
| 4,124,346 A | 11/1978 | Greenwood et al. | 425/188 |
| 4,316,710 A | 2/1982 | Greenwood | 425/186 |
| 4,403,934 A | 9/1983 | Rasmussen et al. | 425/192 R |
| 4,619,599 A | 10/1986 | Herbert et al. | 425/186 |
| 4,773,845 A | 9/1988 | Nagura et al. | 425/592 |
| 4,822,274 A | 4/1989 | Chan et al. | 425/450.1 |
| 4,824,353 A * | 4/1989 | Hirschkorn | 425/190 |
| 4,840,554 A | 6/1989 | Hirschkorn | 425/190 |
| 4,895,507 A * | 1/1990 | Yano | 425/192 R |
| 5,225,208 A | 7/1993 | Minaudo et al. | 425/114 |
| 5,472,332 A * | 12/1995 | Gohlisch et al. | 425/186 |
| 5,494,429 A | 2/1996 | Wilson et al. | 425/192 R |
| 5,551,862 A | 9/1996 | Allred, Jr. | 425/532 |
| 5,681,596 A | 10/1997 | Mills et al. | 425/532 |
| 5,720,986 A * | 2/1998 | Gohlisch et al. | 425/192 R |
| 5,851,561 A * | 12/1998 | Hirschkorn | 425/190 |
| 5,916,602 A | 6/1999 | Klaus | 425/145 |
| 6,067,480 A | 5/2000 | Stuffle et al. | 700/109 |
| 6,126,430 A | 10/2000 | Coyle et al. | 425/188 |
| 6,196,823 B1 | 3/2001 | Coyle et al. | 425/188 |
| 6,273,703 B1 * | 8/2001 | Hirschkorn | 425/192 R |
| 6,398,535 B1 * | 6/2002 | Cloeren | 425/192 R |

* cited by examiner

Primary Examiner—James P. Mackey
Assistant Examiner—Joseph Leyson
(74) Attorney, Agent, or Firm—McCracken & Frank

(57) ABSTRACT

An extrusion die includes a pair of die body portions that together define flow passages and toggle clamps that clamp the die body portions together.

26 Claims, 20 Drawing Sheets

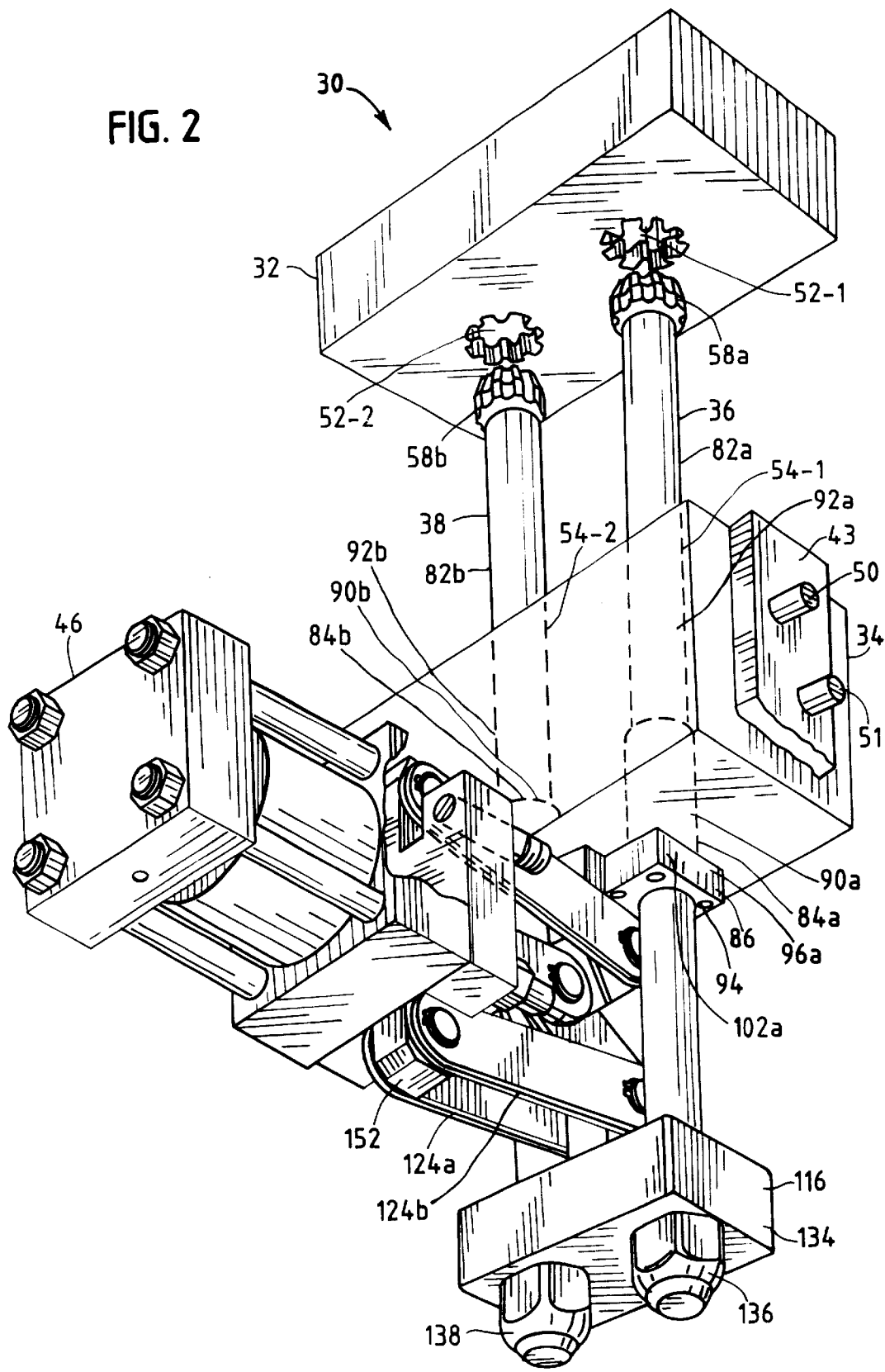

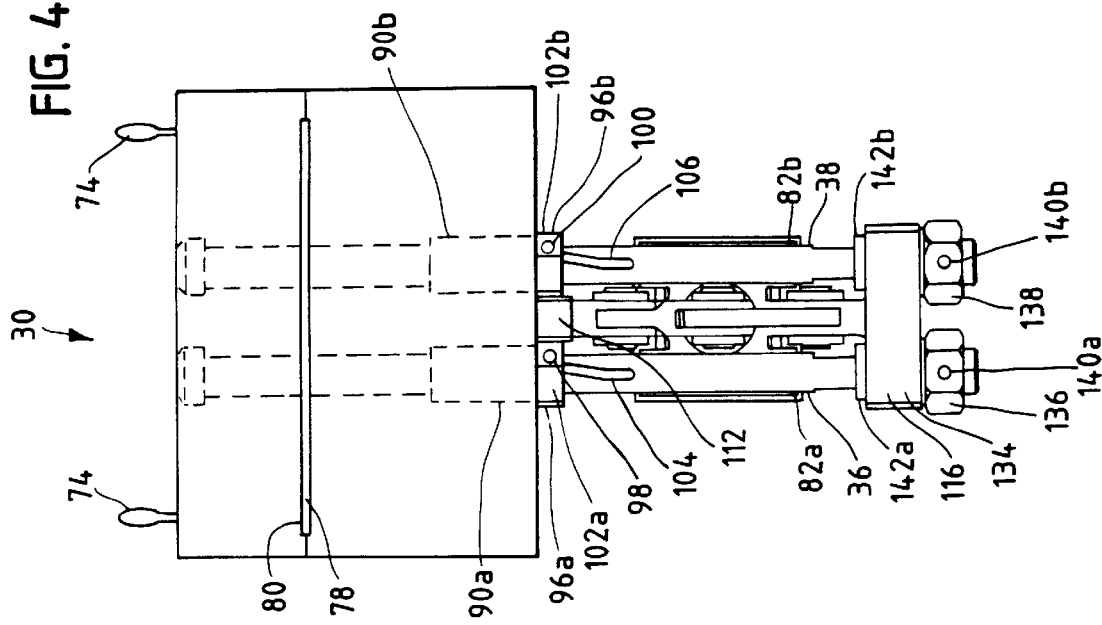
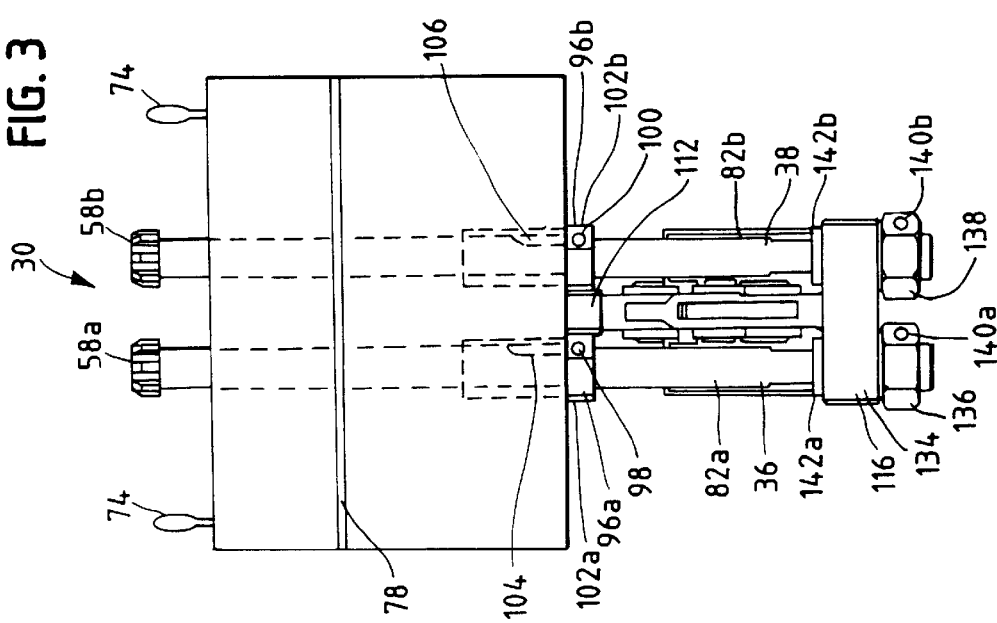

QUICK-RELEASE EXTRUSION DIE

TECHNICAL FIELD

The present invention relates generally to extrusion apparatus and more particularly to an extrusion die.

BACKGROUND ART

Extrusion dies are used to form a desired product out of thermoplastic material. The extrusion die is fed with material at an inlet thereof and produces the desired product at an outlet. The final outlet is often described as possessing a shape that is a cross sectional profile of the final product. An important characteristic of an extrusion die is that it is used in a continuous process. This is different from molding, which is a batch process.

Flat-sheet extrusion dies typically comprise two or more die body portions that are secured together by threaded bolts. Access to the flow passages is obtained by unthreading the bolts. An example of this type of extrusion die is disclosed in commonly-assigned Wilson et al. U.S. Pat. No. 5,494,429, which describes a two-piece die body that forms a sheet of substantially uniform thickness.

Extrusion dies typically require disassembly for cleaning or maintenance of the flow passages. Extrusion dies designed for extrusion of certain types of materials can require disassembly for cleaning more than once a week. This shutting down of production can be time consuming and laborious. Disassembly typically involves unscrewing the threaded bolts that hold the die body portions together. These threaded bolts may be under high torque and difficult to remove. Unscrewing the bolts with hand tools may prove dangerous considering the tools may break off or slip injuring the operator or bystanders. Additionally, the amount of time that the extrusion die is not operating can be an economic disadvantage.

Attempts have been made in the art to speed up disassembly of various extrusion apparatus by use of clamping arrangements. For example, Coyle et al. U.S. Pat. No. 6,196,823, discloses a clamp collar assembly that clamps together an extruder and a die body at their respective peripheral surfaces. Unclamping allows for separation of the die body from the extruder to allow removal of a screen pack filter. While this arrangement is helpful for quickly changing a filter, it does not facilitate access to the flow passages of a die body.

Minuado et al. U.S. Pat. No. 5,225,208, discloses an extrusion die where rubber is co-extruded around metal wire to form tire tread plies. A clamping arrangement secures four die body plates. Two interior plates guide the wires. Two exterior plates extrude rubber onto the wires. Unclamping allows removal of the die body plates. One drawback to this arrangement is that the clamping pressure is applied by a crosspiece disposed atop the plates and clamping forces are applied to the crosspiece by pressure means attached to the ends of the crosspiece. This indirect application of clamping pressure can be less than completely effective to cause proper sealing of the die body plates.

SUMMARY OF THE INVENTION

In accordance with one aspect of the present invention, an extrusion die comprises a pair of die body portions that together define flow passages and toggle clamps that clamp the die body portions together.

In accordance with a further aspect of the present invention, an extrusion die comprises first and second die body portions that define flow passages when assembled together, a frame that holds one of the die body portions and first and second clamping rods disposed in first and second sets of passages in the die body portions, respectively. A toggling apparatus is coupled to the clamping rods and an actuator is coupled to the toggling apparatus. The actuator is operable with the toggling apparatus to move the clamping rods to a clamping position clamping the die body portions together.

In accordance with yet another aspect of the present invention, an extrusion die comprises first and second die body portions that together define flow passages, a frame that holds one of the die body portions, toggle clamps and first and second alignment pins that align the die body portions. The toggle clamps include a first plurality of clamping rods disposed in a second plurality of sets of passages in the die body portions, a third plurality of toggling linkages coupled to the first plurality of clamping rods and a fourth plurality of actuators coupled to the third plurality of toggling linkages and operable therewith to move the clamping rods to a clamping position clamping the die body portions together.

Other aspects and advantages of the present invention will become apparent upon consideration of the following detailed description.

BRIEF DESCRIPTION OF THE DRAWINGS

FIG. 2 is an exploded rear isometric view of the extrusion die of FIG. 1 with portions partially cut away revealing the toggling linkage;

FIG. 3 is a front elevational view of the extrusion die of FIG. 2 with the frame removed showing the toggling linkage in an unlocked position and the addition of eye bolts;

FIG. 4 is a front elevational view of the extrusion die of FIG. 3 showing the toggling linkage in a locked position;

DESCRIPTION OF THE PREFERRED EMBODIMENTS

FIGS. 1–14 are illustrations of a simplified representation of an extrusion die apparatus in the sense that such illustrations are presented to explain many of the principles and features of the present invention. However, the foregoing illustrations are not intended as a detailed representation of an actual extrusion die apparatus. Such a detailed representation is instead illustrated in FIGS. 15–24.

Figure 1:
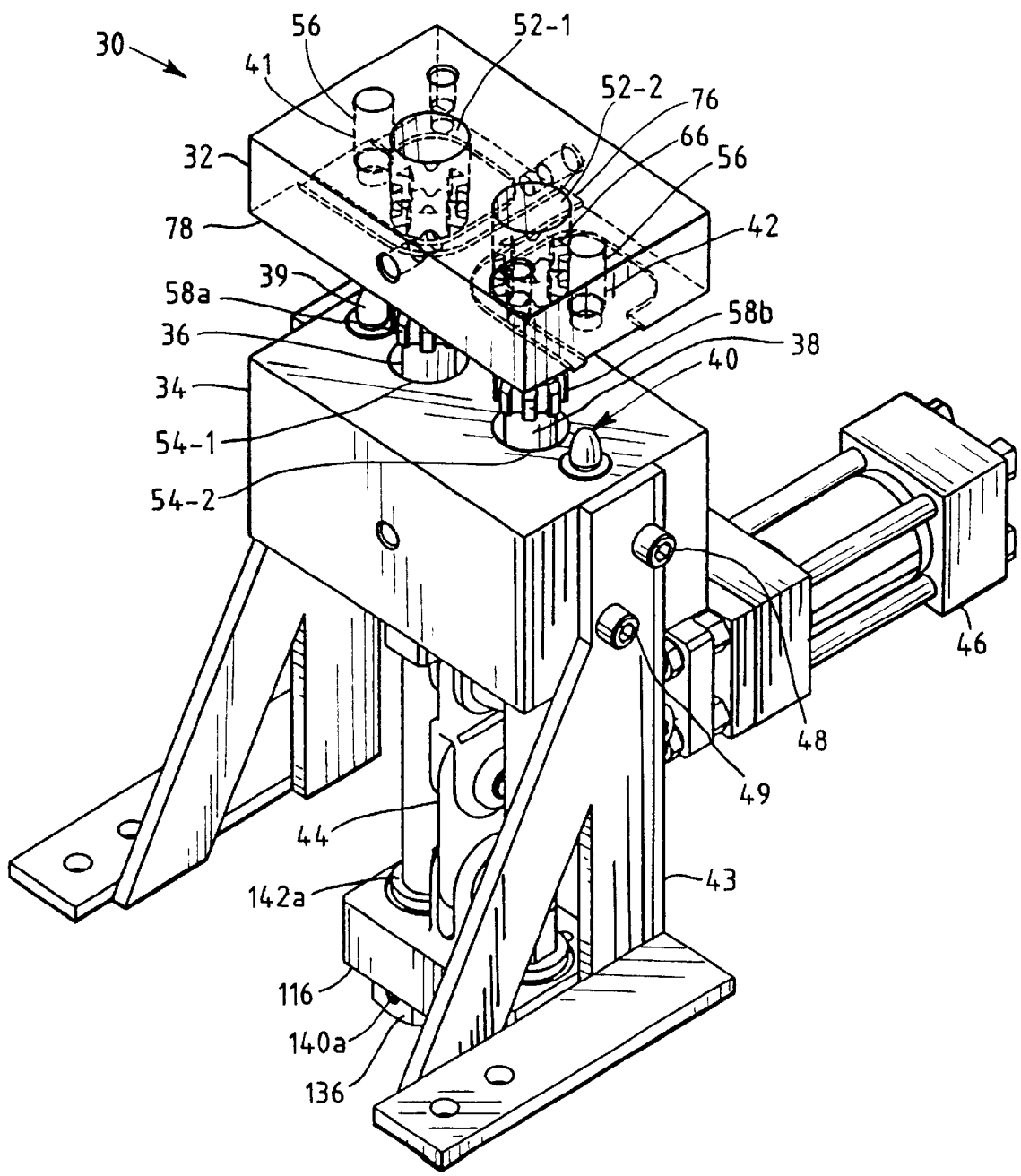
FIG. 1 is an exploded front isometric view of a simplified representation of an extrusion die according to the present invention.

Referring now to FIGS. 1 and 2, an extrusion die 30 incorporating the present invention includes first and second die body portions 32, 34, respectively, first and second clamping rods 36, 38, respectively, first and second alignment pins 39, 40, respectively, first and second alignment bores 41, 42, respectively, a frame 43, a toggling linkage 44 and an actuator 46. The frame 43 is attached to the second die body portion 34 by first through fourth frame bolts 48, 49, 50, 51, respectively.

As seen in FIG. 2, a first set of passages or bores 52-1 and 52-2 extends through the first die body portion 32. Referring again to FIG. 1, a second set of passages or bores 54-1 and 54-2 extends through the second die body portion 34. As seen in FIG. 1, the alignment pins 39, 40, which are located on the second die body portion 34, ensure proper alignment of the first and second die body portions 32, 34 when the die body portions are clamped together due to placement of the pins 39, 40 in the respective bores 41, 42. The alignment bores 41, 42 extend through the first die body portion 32. Each of the bores 41, 42 has an upper threaded portion 56 of larger diameter that allows for the insertion of jack bolts to facilitate removal of the first die body portion 32 from the second die body portion 34.

Figure 9:
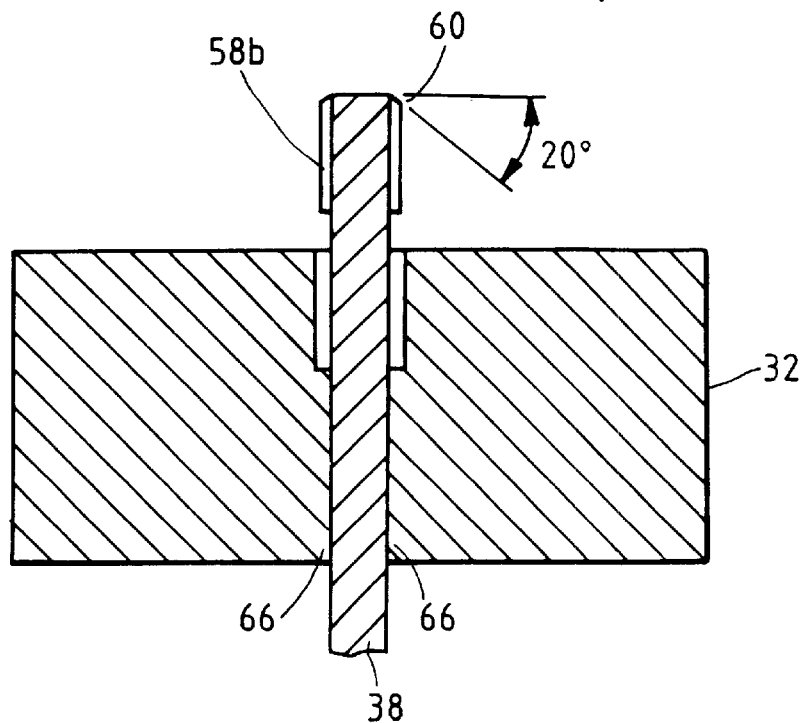
FIG. 9 is fragmentary sectional view taken generally along the lines 9—9 of FIG. 8.
Figure 11:
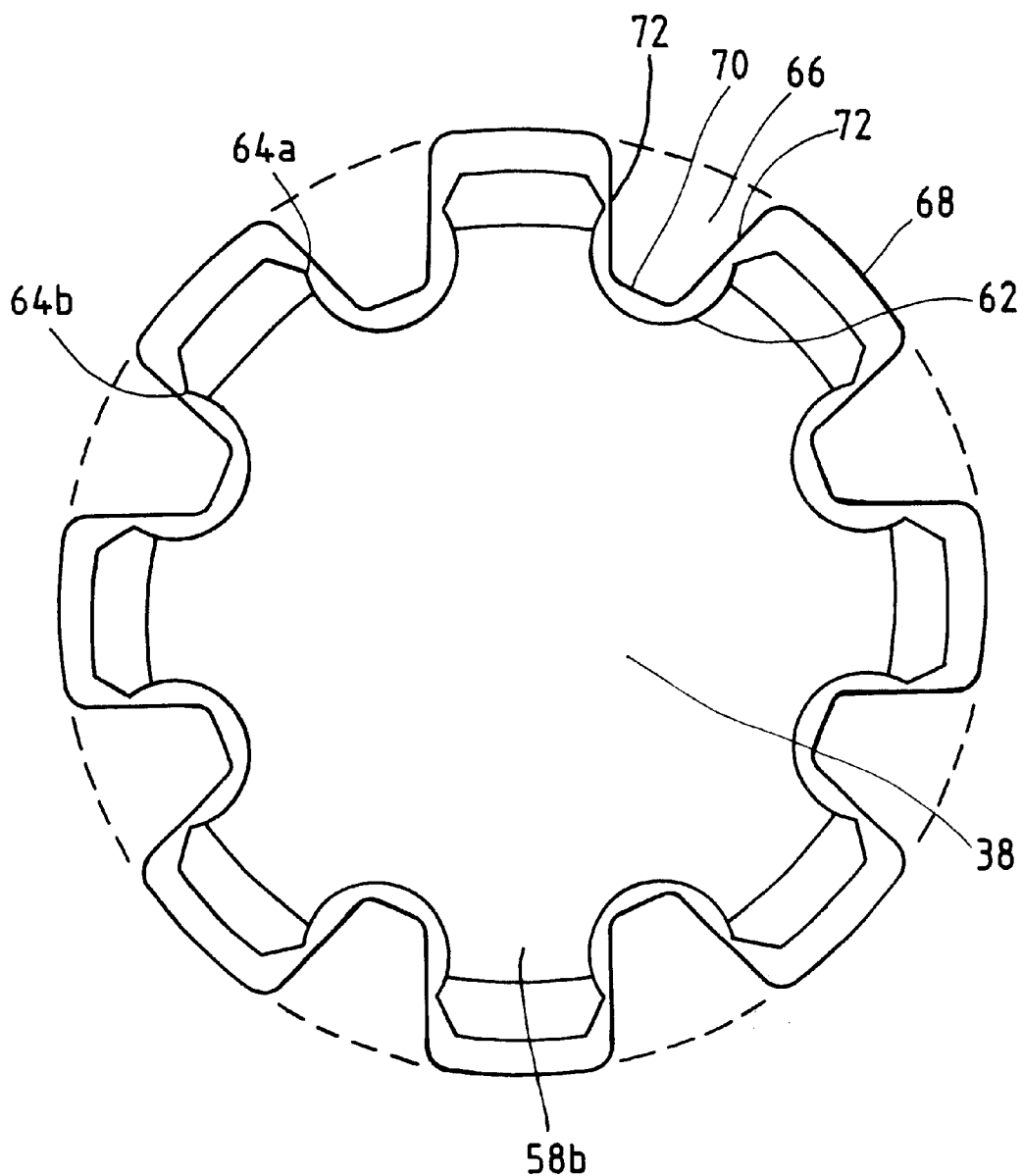
FIG. 11 is an enlarged view of a passage of a first die body portion illustrating a lack of interference of the splines of a rod and the lands of the passage.
Figure 12:
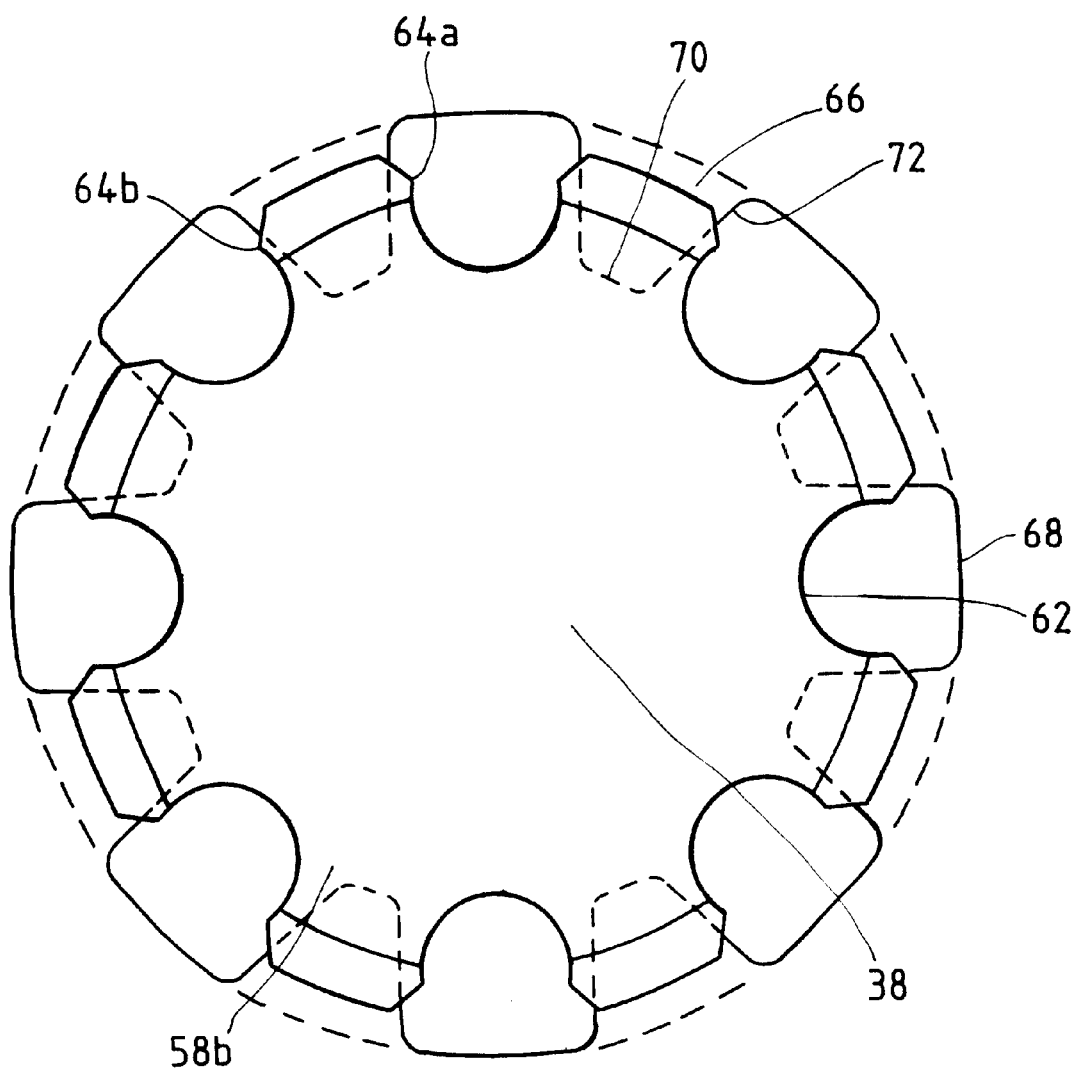
FIG. 12 is an enlarged view of a passage of a first die body portion illustrating interfering engagement of the splines of a rod and the lands of the passage.
Figure 13:
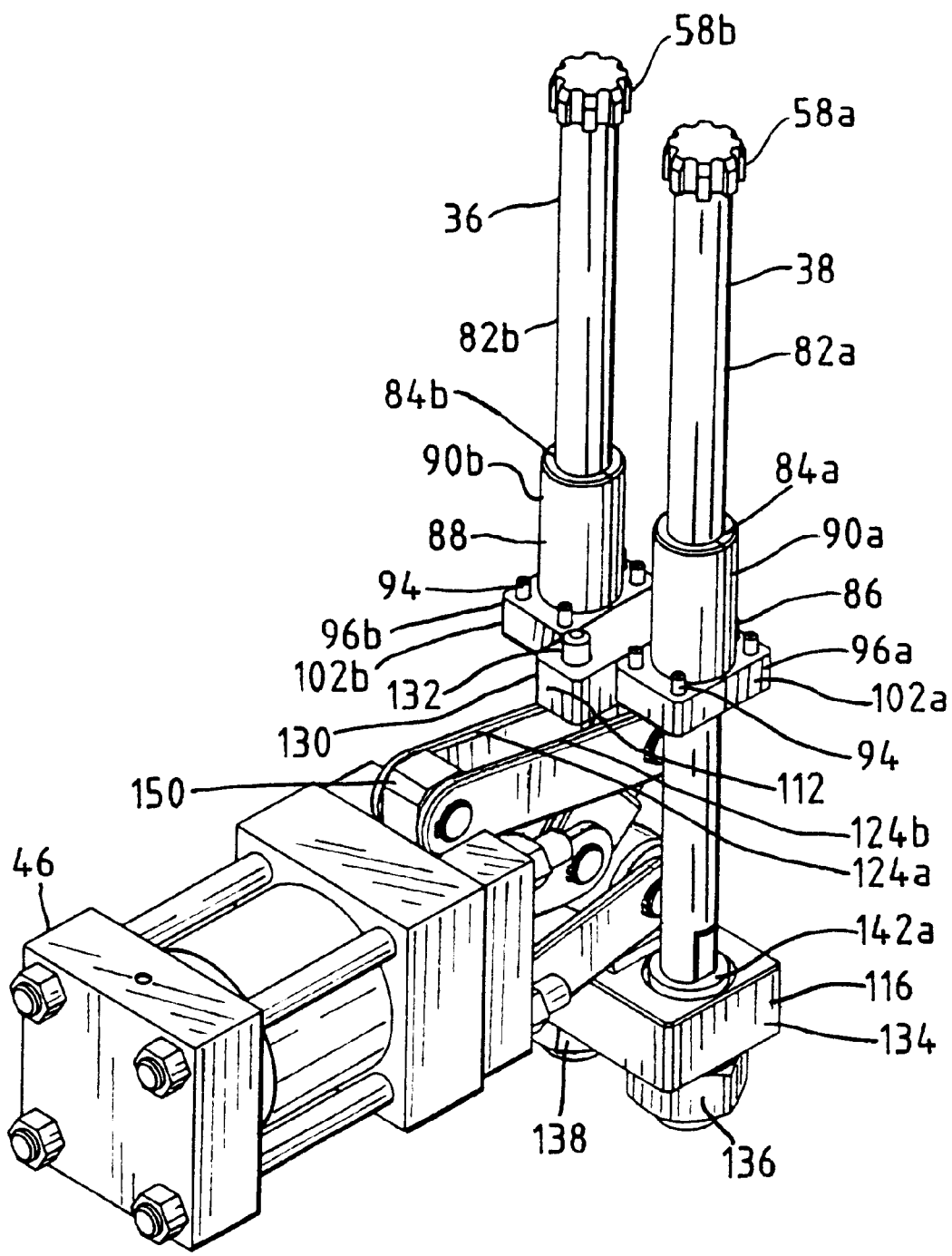
FIG. 13 is a fragmentary isometric view of the toggling linkage in the position shown in FIGS. 3 and 5 with portions cut away revealing the toggling linkage.

A first plurality of splines 58a is disposed on the rod 36, and a second plurality of splines 58b is disposed on the rod 38. Each of the splines 58a, 58b includes a beveled edge 60 as seen in FIG. 9. The beveled edge 60 facilitates placement of the rods 36, 38 into the passages 52-1, 52-2. Referring to FIGS. 11 and 12, the walls defining each spline 58a, 58b include a substantially round channel 62 and tapered first and second walls 64a, 64b, respectively.

Spaced lands 66 having grooves 68 therebetween are disposed in the walls of the first set of passages 52-1, 52-2. Each of the lands 66 includes a base wall 70 and sidewalls 72. The splines 58a, 58b are aligned with the grooves 68 when the apparatus is in the position shown in FIGS. 1–3, 5 and 8, and such alignment is shown in greater detail in FIG. 11. This alignment allows the first die body portion 32 to be lifted off of or placed upon the second die body portion 34 without blocking interference of the lands 66 with the splines 58a, 58b. In this unlocked position, the walls defining the channels 62 and/or the tapered walls 64a, 64b make light or minimal contact with the lands 66. The tightness of the fit depends on how closely the splines 58a, 58b are machined to fit within the lands 66. This geometry of the channel 62 and walls 64a and 64b is preferred over flat-walled splines because it offers less contacting surface area, and therefore less frictional resistance, allowing a user to more easily remove or replace the first die body portion 32. Referring next to FIGS. 3–6, eye bolts 74 may be used to facilitate lifting of the first die body portion 32.

Referring next to FIGS. 1, 3, and 4, the die body portions 32, 34 together define an inlet 76, an outlet 78 and a cavity 80 when assembled together. The cavity 80 is in fluid communication between the inlet 76 and the outlet 78. Material feeds into the inlet 76, passes through the cavity 80 and exits from the outlet 78.

Referring next to FIG. 13 and again to FIG. 2, the rods 36, 38 include main portions 82a, 82b, respectively, that extend through bores 84a and 84b of first and second bushings 86, 88, respectively. Each of the bushings 86, 88 includes an elongate sleeve 90a and 90b, respectively, wherein each of the sleeves 90a, 90b (seen in FIG. 13) is disposed in lower ends 92a, 92b, of the passages 54-1, 54-2 in the second die body portion 34. The bushings 86, 88 are secured by bolts 94 or other fasteners that extend through planar mounting portions 96a, 96b into the second die body portion 34. As should be evident from the foregoing, the main portions 82a, 82b of the rods 36, 38 extend through the passages 54-1 and 54-2 and may further extend through passages 52-1 and 52-2 in the first die body portion 32 as noted in greater detail hereinafter.

Figure 5:
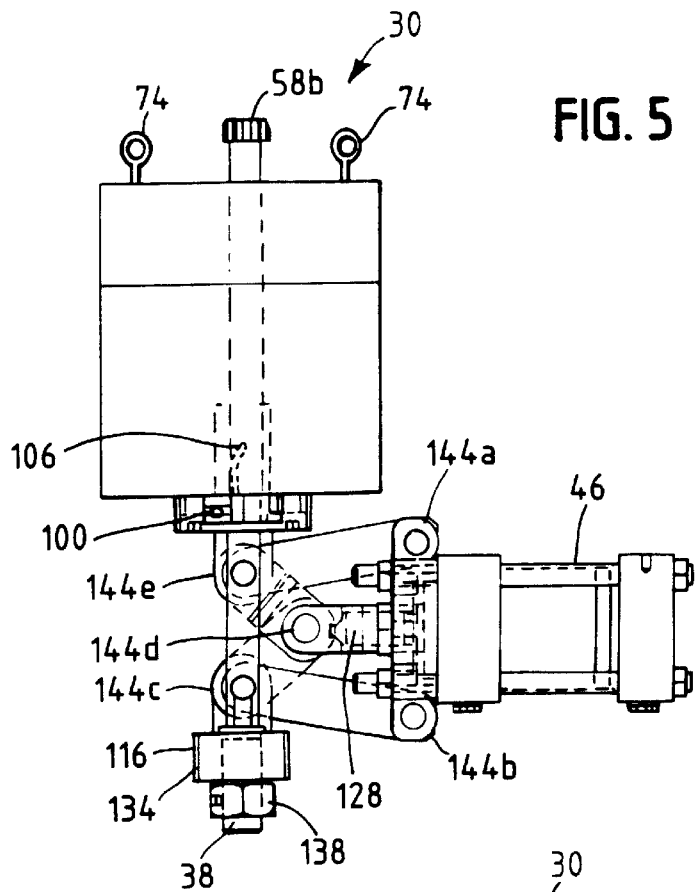
FIG. 5 is a side elevational view of the extrusion die of FIG. 3.
Figure 10:
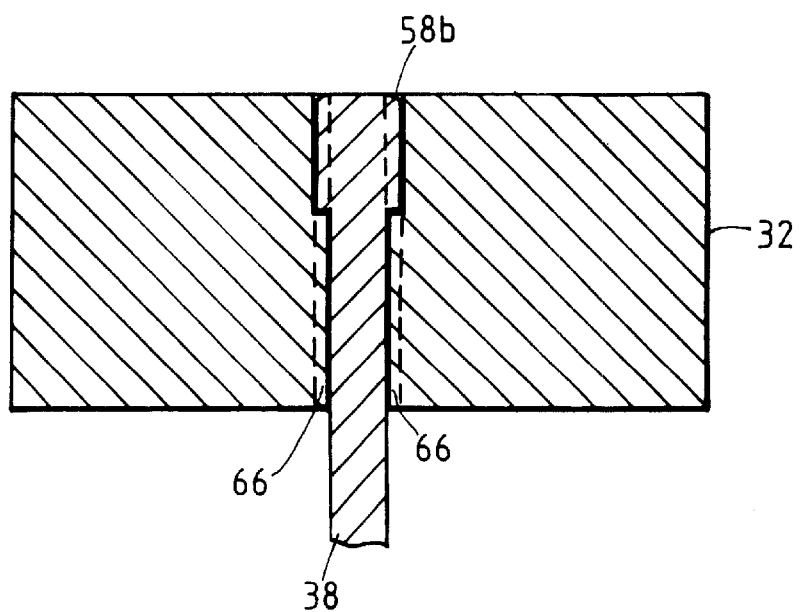
FIG. 10 is a fragmentary sectional view taken generally along the lines 10—10 of FIG. 7.

Referring now to FIGS. 3–5, first and second stationary pins 98, 100, respectively, are disposed in walls 102a and 102b, respectively, of the planar mounting portions 96a, 96b, respectively. The pins 98, 100 extend into and engage with walls defining first and second slots 104, 106, respectively, that are cut, drilled or otherwise formed in the first and second rods 36, 38. The slots 104, 106 have a circumferential and axial extent such that both of the rods 36, 38 are rotated along the longitudinal axis of the rod a predetermined amount by the pins 98, 100 when the rods 36, 38 are axially moved toward a clamping position. Referring next to FIGS. 10 and 12, when the rods 36, 38 are in a clamped position, the splines 58a, 58b interferingly engage with the lands 66, thereby preventing the removal of the first die body portion 32 and providing sealing pressure.

Figure 14:
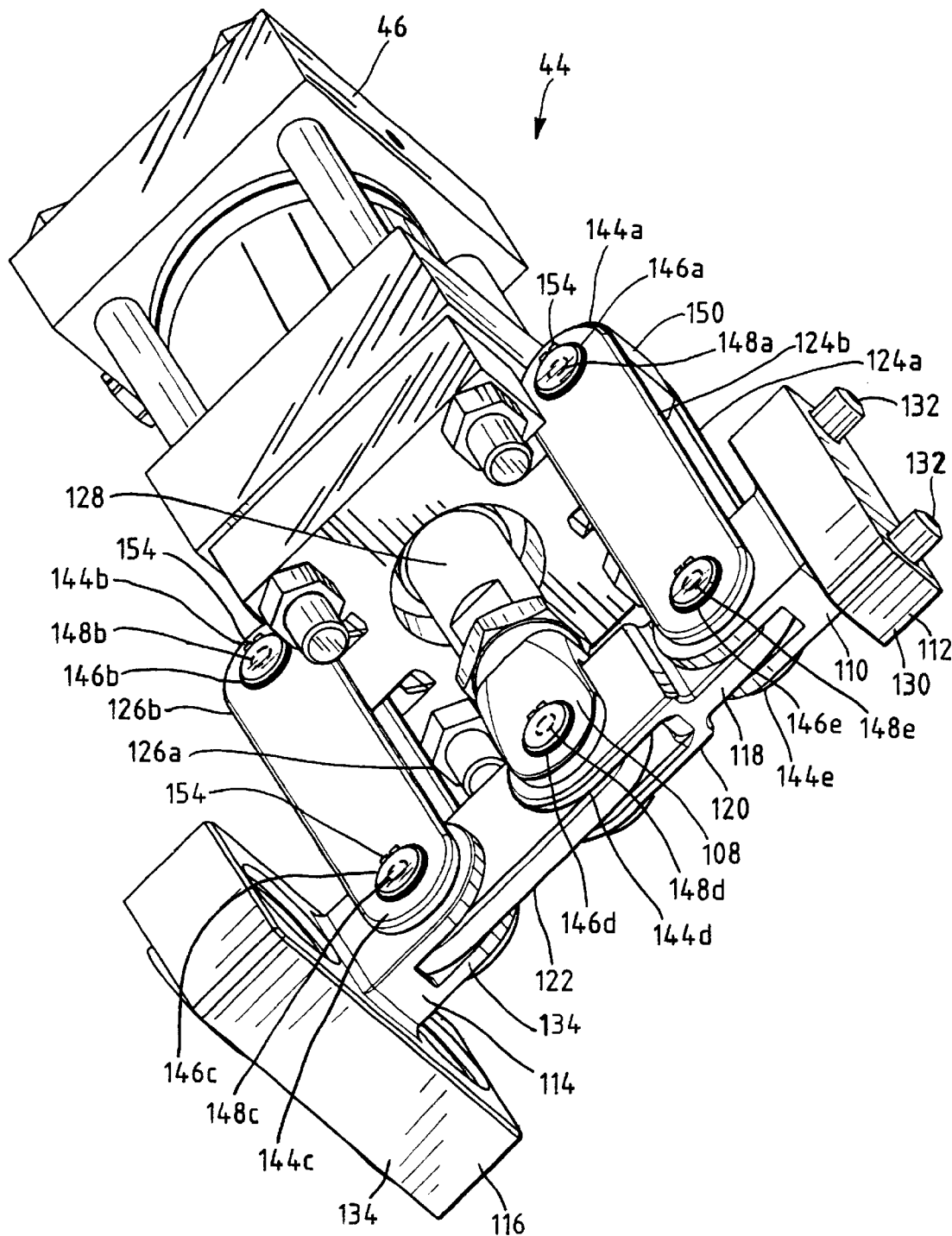
FIG. 14 is an isometric view of the toggling linkage in the position shown in FIGS. 4 and 6 with the rods and nuts removed.

Referring next to FIG. 14, the toggling linkage 44 has a piston clevis 108, a die body clevis 110 of a first mounting member 112 and a yoke clevis 114 of a second mounting member 116. The toggling linkage 44 further includes a first inner arm 118 having an integral clevis portion 120, a second inner arm 122, a first pair of outer arms 124a, 124b, respectively, and a second pair of outer arms 126a, 126b, respectively. The piston clevis 108 is secured to a piston rod 128 of the actuator 46 by threading or other suitable means of attachment. The first mounting member 112 includes a bearing member 130 attached by bolts 132 to the second die body portion 34 (FIGS. 2–6). The second mounting member 116 includes a yoke 134. Referring again to FIG. 2, first and second nuts 136, 138, are threaded onto the rods 36, 38. The nuts 136, 138 are further secured to the rods 36, 38 by first and second set screws 140a, 140b, respectively, that are disposed in mated threaded bores that extend through each of the nuts 136, 138 and bear against the rods 36, 38. The nuts 136, 138 are rotatable with the rods 36, 38. A side of the yoke 134, opposite the nuts 136, 138, bears against shouldered portions 142a, 142b of the rods 36, 38. The nuts 136, 138 secure the rods 36, 38 to the yoke 134 but do not prevent rotational movement about the longitudinal axes of the rods 36, 38. In this regard, the nuts 136, 138 are spaced a sufficient distance from each of the shouldered portions 142 so that the combination of the nuts 136, 138 and the portions 142 does not bear so tightly against the yoke 134 so as to impair this rotational ability.

Figure 6:
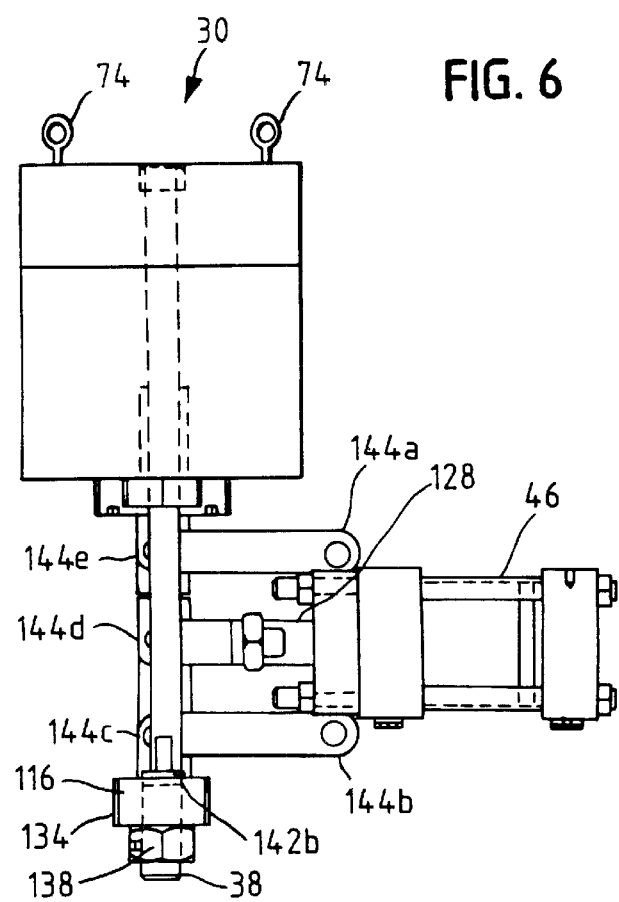
FIG. 6 is a side elevational view of the extrusion die of FIG. 4
Figure 7:
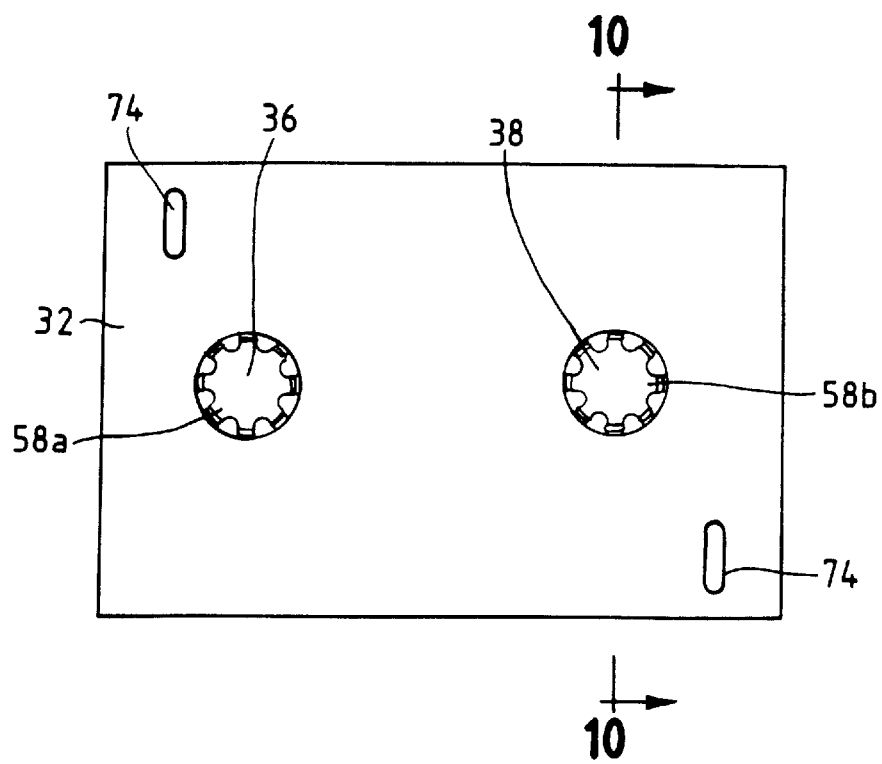
FIG. 7 is a plan view of the first die body portion of FIG. 4.
Figure 8:
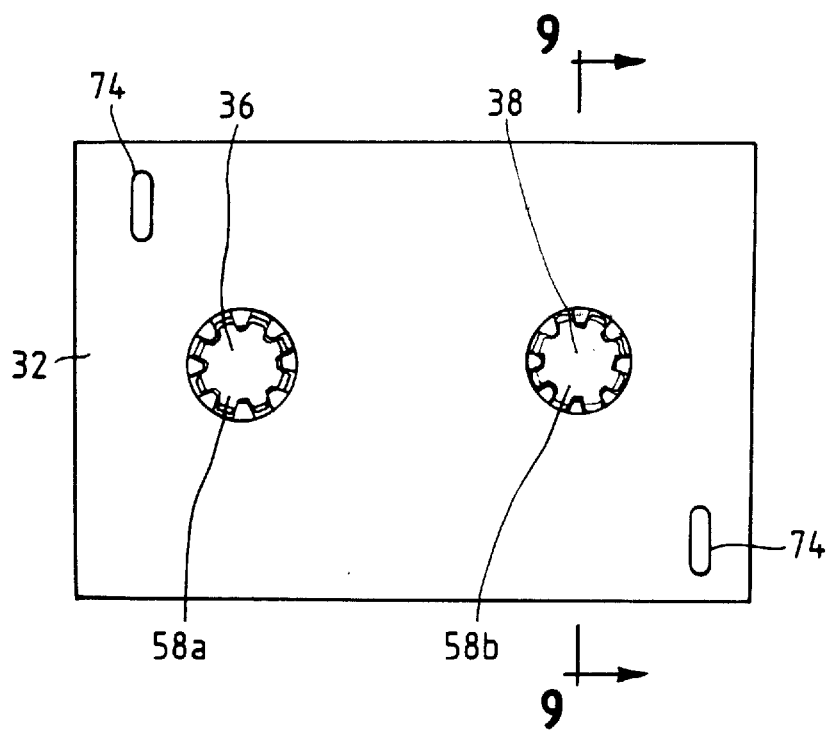
FIG. 8 is a plan view of the first die body portion of FIG. 3.

Referring to FIGS. 5, 6 and 14, the toggling linkage 44 includes five articulatable joints 144a, 144b, 144c, 144d, 144e, respectively. The joints 144a–144e include first through fifth rotatable axles 146a–146e, respectively, that are retained in aligned bores 148a–148e, respectively, extending through the arms 118, 122, 124a, 124b, 126a, 126b. The first axle 146a further extends through a bore in a first lug 150 disposed on the actuator 46. The second axle 146b further extends through a bore in a second lug 152 (seen in FIG. 2) disposed on the actuator 46. The axles 146a–146e are retained in position by a plurality of snap rings 154 disposed in grooves (not shown) at each end of each of the axles 146a–146e.

Referring next to FIGS. 4 and 6, the die 30 is in a locked, or clamping, position during extrusion. FIGS. 10 and 12 show the lands 66 of the first die body portion 32 in interfering engagement with the splines 58b of the rod 38 preventing removal of the first die body portion 32 and providing sealing pressure when the actuator 46 extends the piston clevis 108, thereby locking the toggling linkage 44 and translating the rods 36, 38 to a clamping position. Although FIGS. 10 and 12 illustrate the engagement of the rod 38 with the lands 66, the FIGS. 10 and 12 are equally illustrative of the engagement of the rod 36 with the lands 66.

Removal of the first die body portion 32 is accomplished by retraction of the piston clevis 108 by the actuator 46. This causes the second mounting member 116 to move toward the first mounting member 112. This movement causes axial translation of the rods 36, 38 to the unlocked position shown in FIGS. 3 and 5, relieves the die body portions 32, 34 of clamping pressure. In addition, the walls defining the slots 104, 106 of the rods 36, 38 engage the stationary pins 98, 100 that are disposed within each bushing 86, 88. This causes a predetermined rotation of the rods 36, 38 about the longitudinal axes thereof, thereby aligning the splines 58a, 58b with the grooves 68 as shown in FIG. 11, allowing an operator to slide the first die body portion 32 off of the rods 36, 38 without the interference shown in FIG. 12.

Referring to FIGS. 3–6 and 14, extension of the piston rod 128 causes the articulatable joint 144c to move away from the articulatable joint 144e, because the joint 144e is fixed relative to the die body portions 32, 34 and the joint 144c is fixed to the rods along the axial direction thereof. Extension of the piston rod 128 causes the rods 36, 38 to move downwardly to the position seen in FIGS. 4 and 6. During this movement, the arms 124a, 124b and 126a, 126b pivot outwardly about the joints 144a, 144b. Also during this movement the actuator 46 moves somewhat. At the end of travel, the rods 36, 38 are moved to the position shown in FIGS. 4 and 6 and the first pair of arms 124a, 124b and the second pair of arms 126a, 126b assume a perpendicular alignment relative to the rods 36, 38. Also, the first and second inner arms 118 and 122 assume aligned positions substantially parallel to the rods 36, 38. Thereafter, when the piston rod 128 is retracted, the inner arms 118 and 122 are moved to the position shown in FIGS. 3 and 5 wherein the inner arms 118 and 122 are out of alignment with respect to one another and with respect to the rods 36, 38. During this movement, the arms 124a, 124b and 126a, 126b pivot inwardly about the joints 144a, 144b. This movement, in turn, causes the rods 36, 38 to move upwardly with respect to the die body portions 32, 34. As noted previously, the rods 36, 38 rotate about the longitudinal axes thereof due to the placement of the pins 98, 100 into the slots 104, 106.

Figure 18:
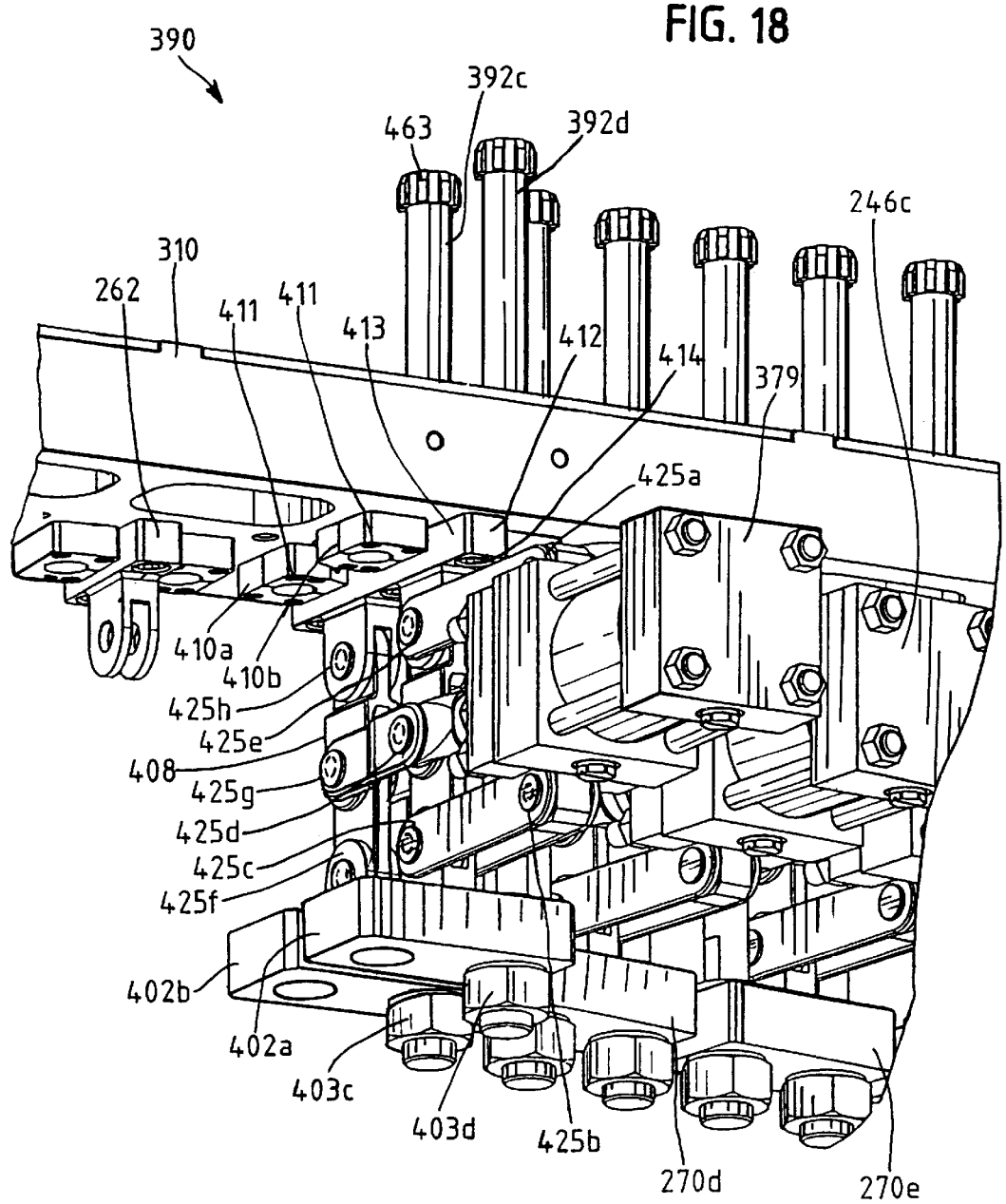
FIG. 18 is a fragmentary isometric view of a portion of the apparatus of FIG. 16.
Figure 24:
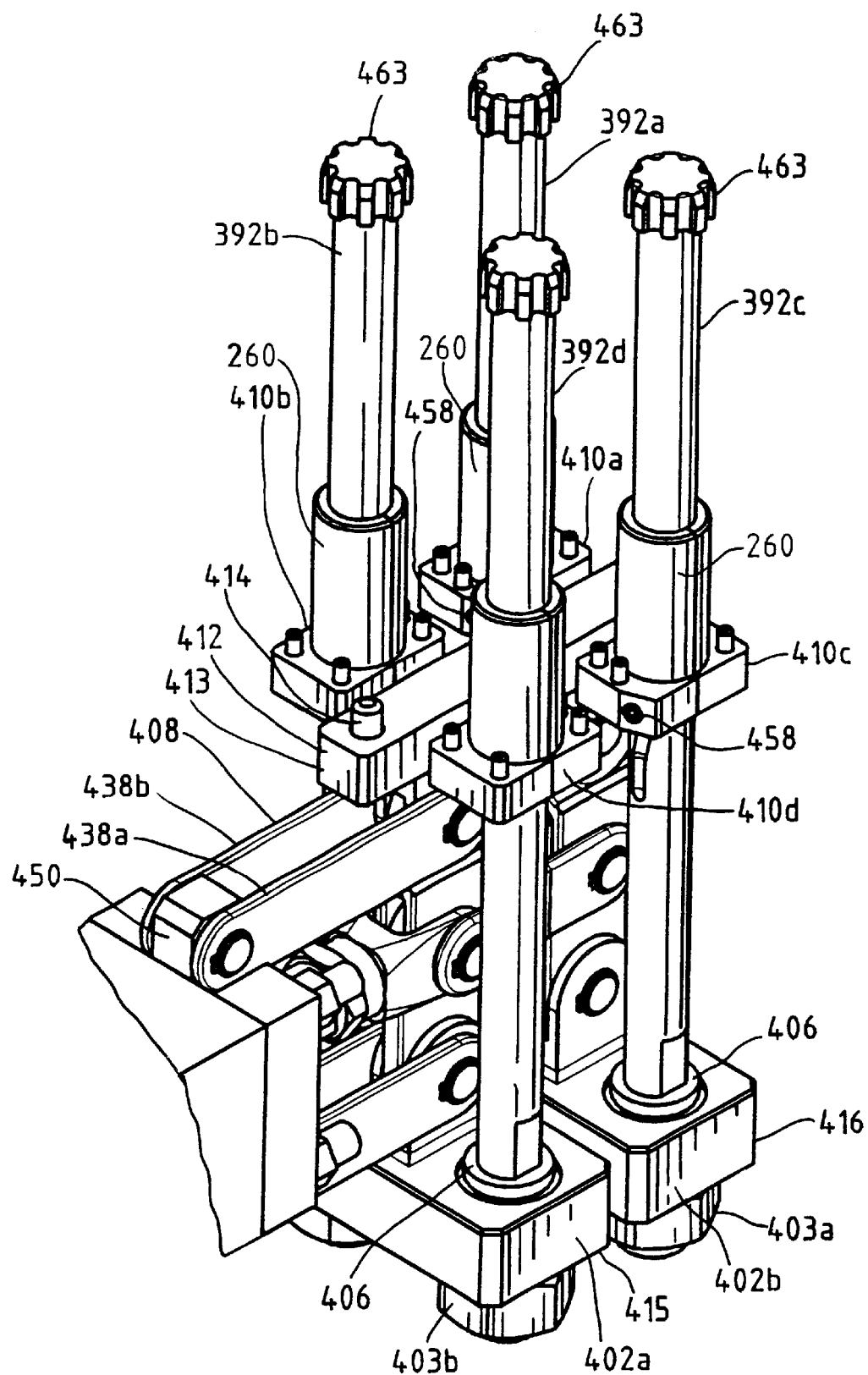
FIG. 24 is an enlarged fragmentary view of the offset toggling linkage.

Referring now to FIGS. 15–22, a preferred embodiment of an apparatus 230 according to the present invention includes first and second die body portions 232, 234, respectively, that differ from the die body portions 32, 34 in some respects that will be apparent hereinafter. The apparatus 230 includes a plurality of paired clamping rods 236a–236f, respectively, wherein each of the plurality of paired clamping rods 236a–236f is identical to each of the rods 36, 38, respectively. The apparatus 230 further includes a plurality of toggling linkages 244a–244f, respectively, each of which is identical to the toggling linkage 44, and a plurality of actuators 246a–246f, that operate the toggling linkages 244a–244f, respectively, and each of which is identical to the actuator 46. The apparatus further includes a plurality of first passages or bores 252a–252f, respectively, disposed in the first die body portion 232, wherein each of the plurality of first passages 252a–252f is identical to the first set of passages 52-1, 52-2 described above. A plurality of second passages (not shown) is disposed in the second die body portion 234, wherein each of the plurality of second passages is identical to the second set of passages 54-1, 54-2 noted above. A plurality of paired bushings 260, seen in FIG. 24, is also provided wherein each of the bushings is identical to the bushings 86, 88 and wherein each of the rods 236a–236f is disposed therethrough. Each of a plurality of first mounting members 262, one of which is shown in FIG. 18, is disposed between each pair of the paired clamping rods 236a–236f wherein each of the plurality of first mounting members is identical to the first mounting member 112. A plurality of second mounting members 270a–270f, identical to the second mounting member 116, is provided as is a plurality of paired nuts 275a–275f. Each of the pairs of nuts 275a–275f is identical to the nuts 136, 138 and each includes a set screw therein identical to the set screws 140a, 140b described above. The pairs of nuts 275a–275f retain the second mounting member 270a–270f, respectively, to the ends of the pairs of rods 236a–236f such that the rods are rotatable as in the above embodiment.

The apparatus 230 further includes first and second alignment pins 280a, 280b, respectively, and first and second alignment bores 282a, 282b, wherein each of the first and second alignment pins 280a, 280b are substantially similar to pins 39, 40. However, the pins 280a, 280b may be of larger size than pins 39, 40 to accommodate the larger first die body portion 232, and each of the first and second alignment bores 282a, 282b may be of larger size than alignment bores 41, 42 to accommodate the potentially larger alignment pins 280a, 280b.

The apparatus 230 further includes a cart 300, along with structures carried by the cart 300 discussed hereinafter, that is preferably movable on a support surface by means of casters or wheels 302. A housing 304 is mounted by a plurality of slides 306 carried by the cart 300. The slides 306 allow for adjustment of the first and second die body portions 232, 234 in a horizontal direction relative to the cart 300. Adjustment of the first and second die body portions 232, 234 horizontally allows a user to more easily align the die body portions with other equipment that receives extruded product.

An adjustable platen 310 is mounted atop the housing 304. The platen 310 includes bores (not shown) through which each of the plurality of clamping rods 236a–236f extend. Furthermore, each of the plurality of paired bushings 260 and each of the plurality of first mounting members 262 are mounted to the platen 310.

The adjustable platen 310 is mounted atop the housing 304 by four threaded adjustment rods 340a–340d that are threaded into corresponding bores (not shown) in the housing 304, and first, second, and third sets of nuts 341, 342, and 343 threaded onto the rods 340a–340d. Each of the set of nuts 341 is welded onto each of the respective rods 340a–340d. Each of the set of nuts 343 is welded to the housing 304.

Decreasing the height of the platen 310 is accomplished by turning each of the nuts 342 to a lower position on the rods 340. Then, the rods 340 are turned via the set of nuts 341 so that the rods 340 extend further into the bores of the housing 304. Increasing the height of the platen 310 is accomplished by turning the rods 340 via the set of nuts 341 so that they are elevated with respect to the platen 310. Then, each of the second set of nuts 342 are turned so that they rise to the surface of the platen 310. The ability to adjust the first and second die body portions 232, 234 vertically allows a user to easily align the die body portions 232, 234 with handling apparatus downstream thereof.

The second die body portion 234 is mounted to the platen 310 by any suitable fasteners, such as bolts (not shown).

Figure 19:
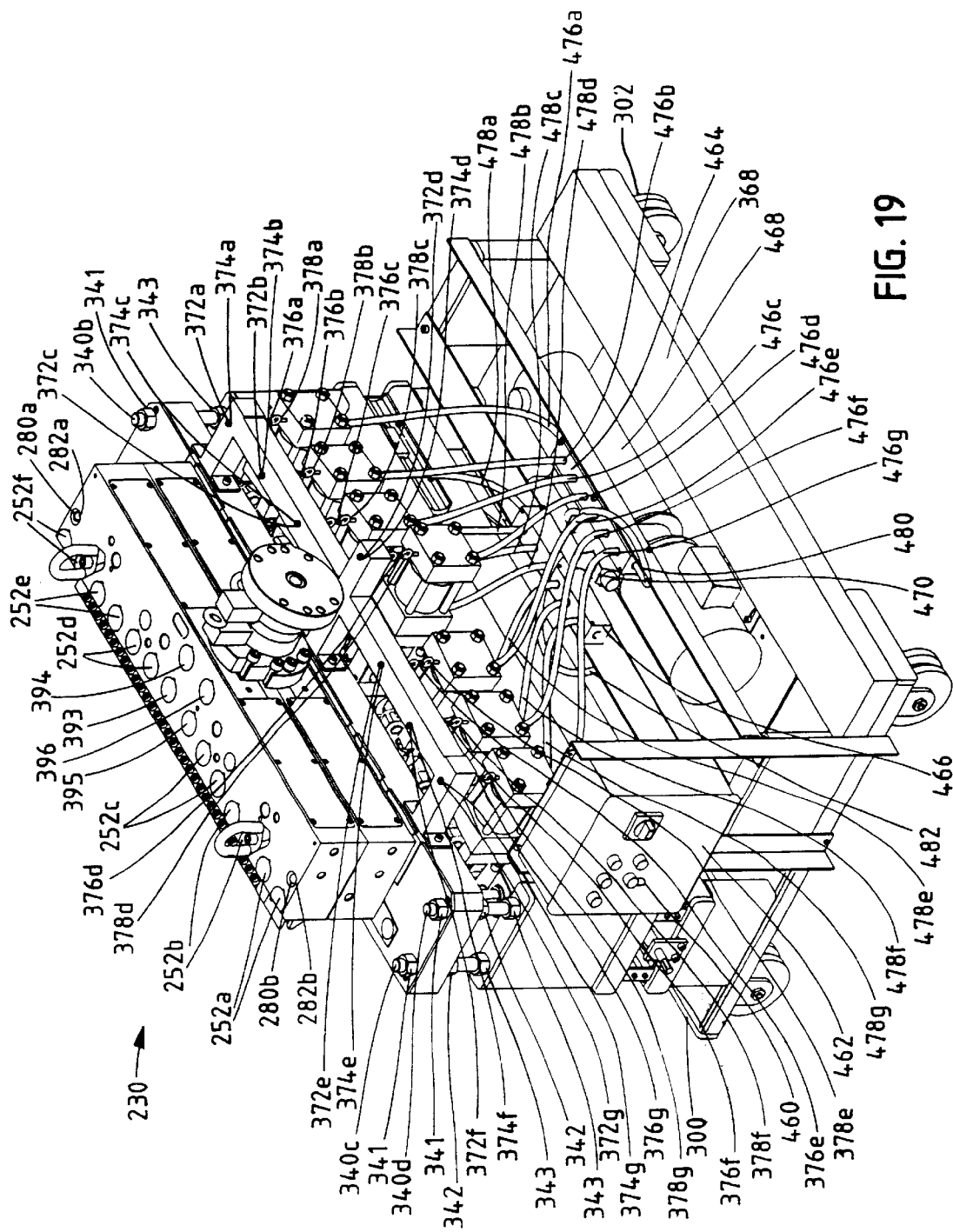
FIG. 19 is rear isometric view of the apparatus of FIG. 15.
Figure 20:
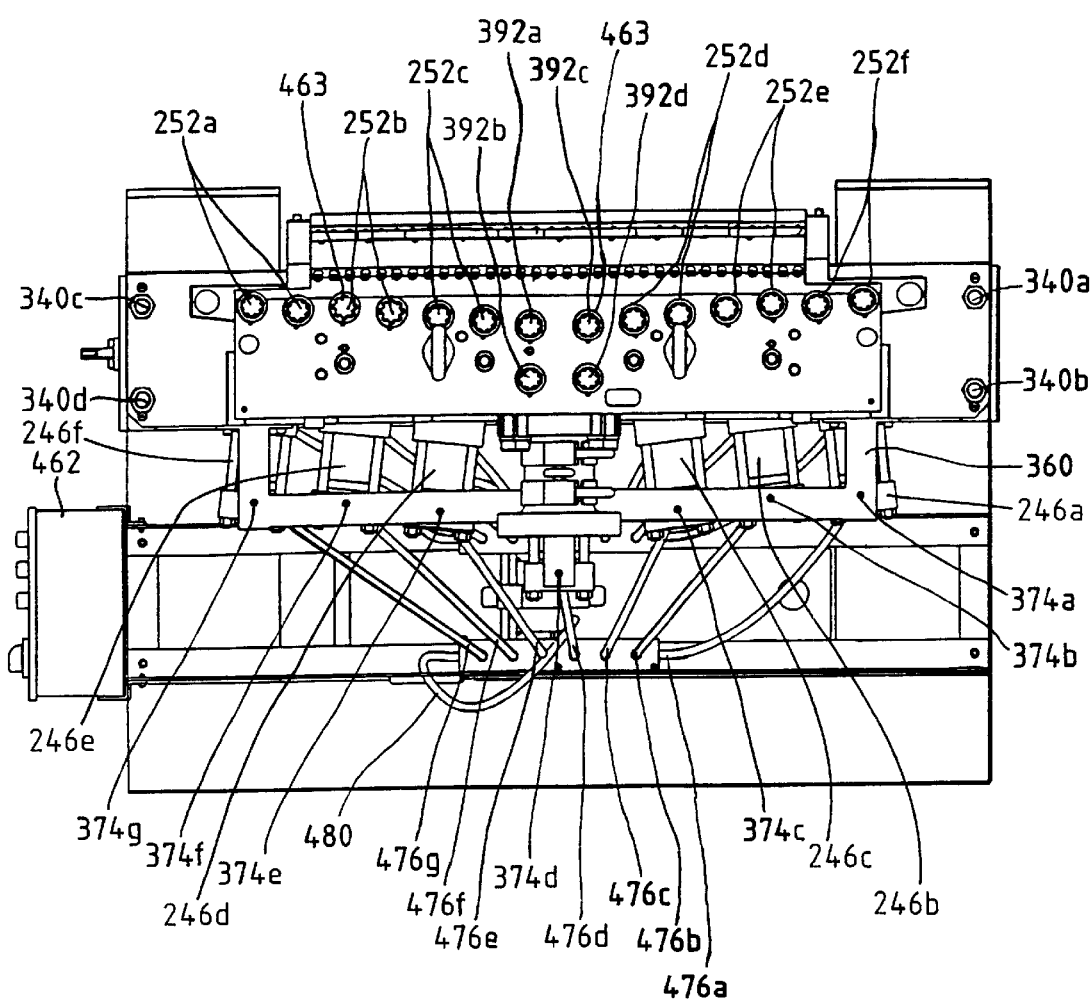
FIG. 20 is a plan view of the apparatus of FIG. 15.
Figure 22:
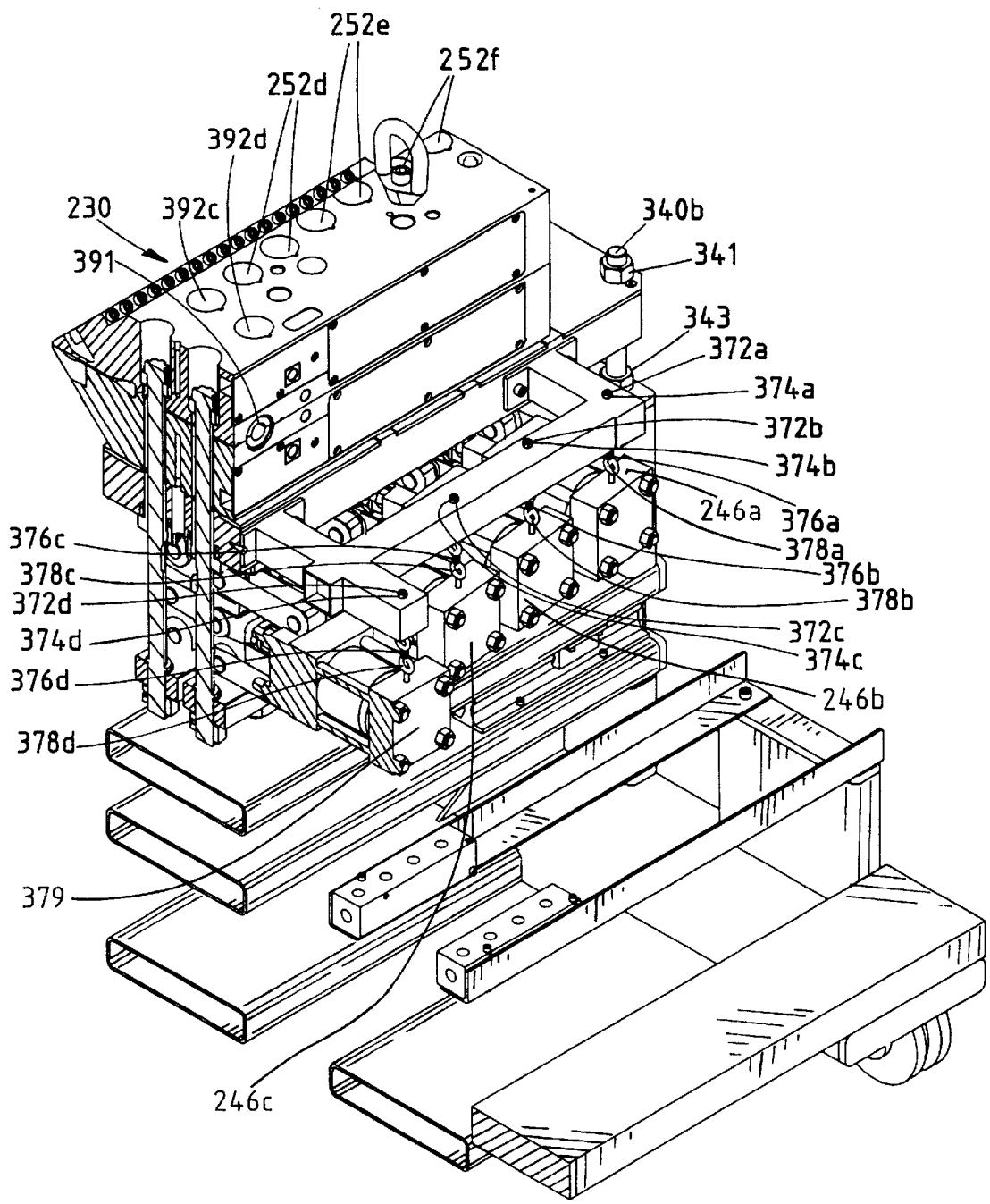
FIG. 22 is an enlarged fragmentary isometric view, partly in section, wherein the section is taken generally along the lines 22—22 of FIG. 16.

The cart 300 further includes an actuator support beam 360, a counterweight 368 and a control panel 370. The actuator support beam 360 is secured to the rear of the platen 310 by threaded bolts. Referring to FIGS. 19, 20 and 22, threaded eye bolts 372a–372g extend through bores in the actuator support beam 360 such that the eye portion of each of the bolts 372a–372g is disposed on the side of the beam 360 facing the actuators 246a–246f. Nuts 374a–374g are disposed on the opposite side of the beam 360 and secure the eye bolts 372a–372g to the support beam 360. A plurality of springs 376a–376g attach the eye portions of the eye bolts 372a–372g and further attach to eye portions of eye bolts 378a–378g that are threaded into threaded bores in each of the actuators 246a–246g and in an offset actuator 379 wherein the bolt 378d is threaded into the bore of the actuator 379. The springs 376 serve to absorb motion of the actuators 246 and 379 when actuated.

Figure 15:
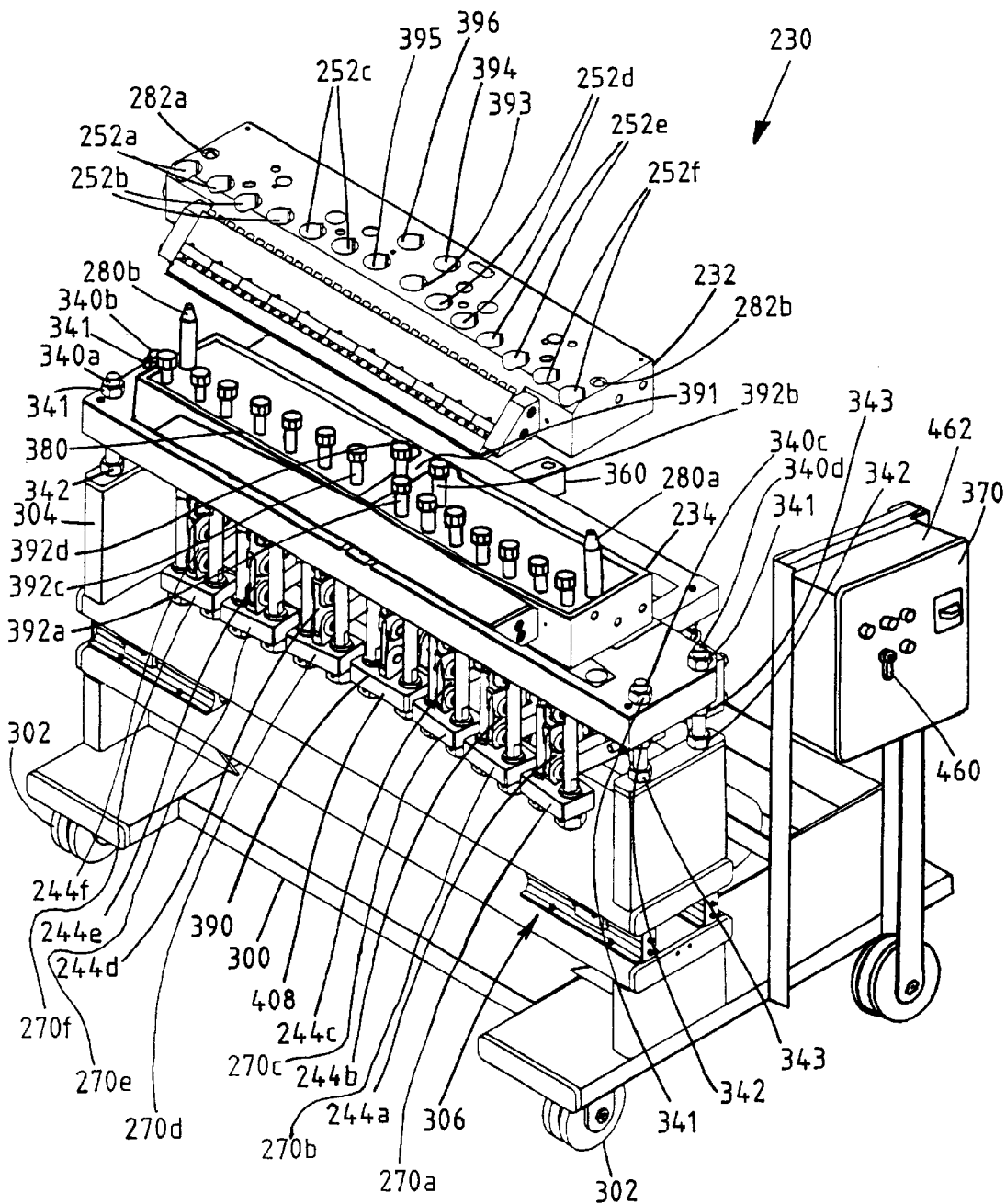
FIG. 15 is an exploded front isometric view of a preferred embodiment of the present invention.
Figure 16:
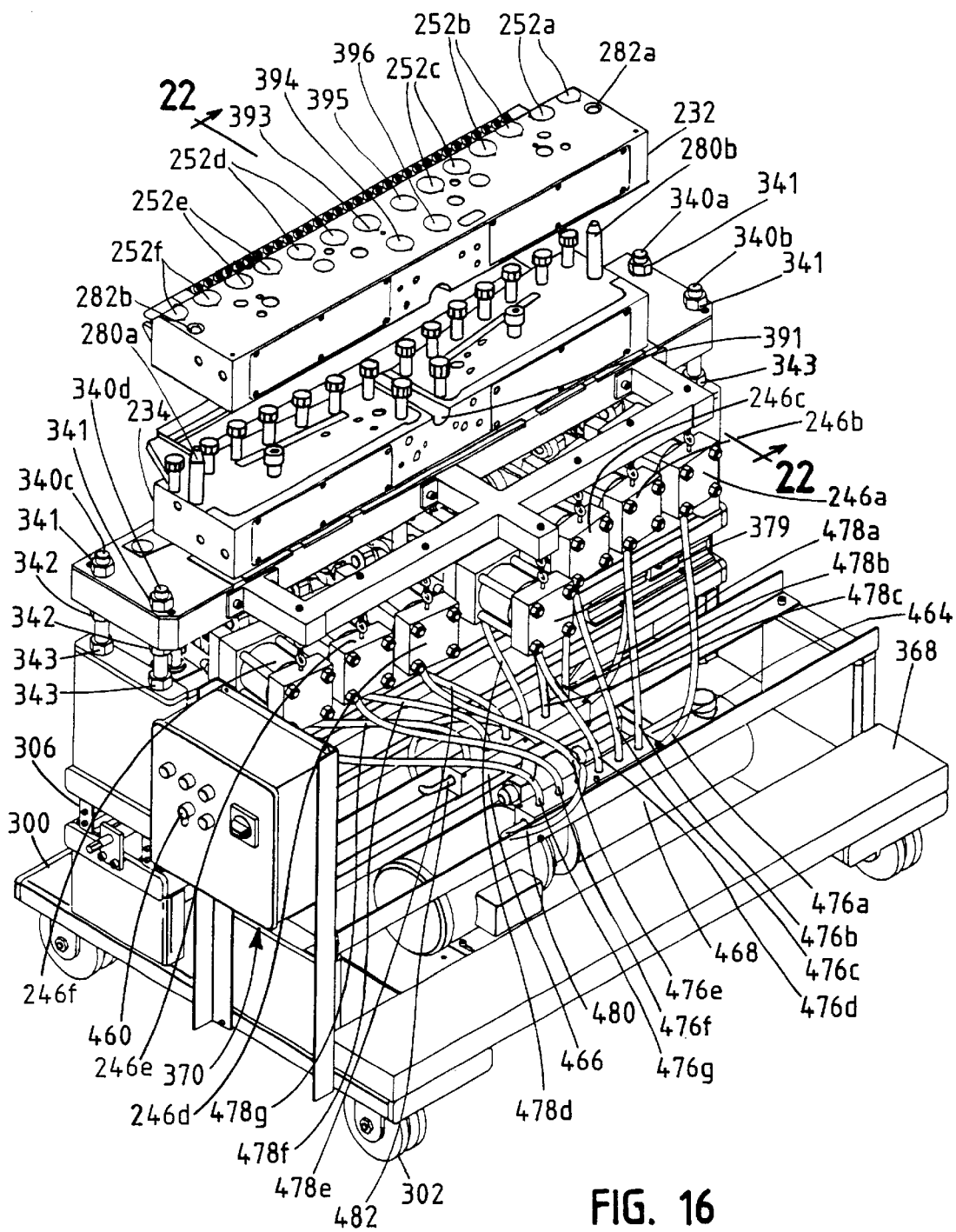
FIG. 16 is an exploded rear isometric view of the preferred embodiment of FIG. 15.
Figure 17:
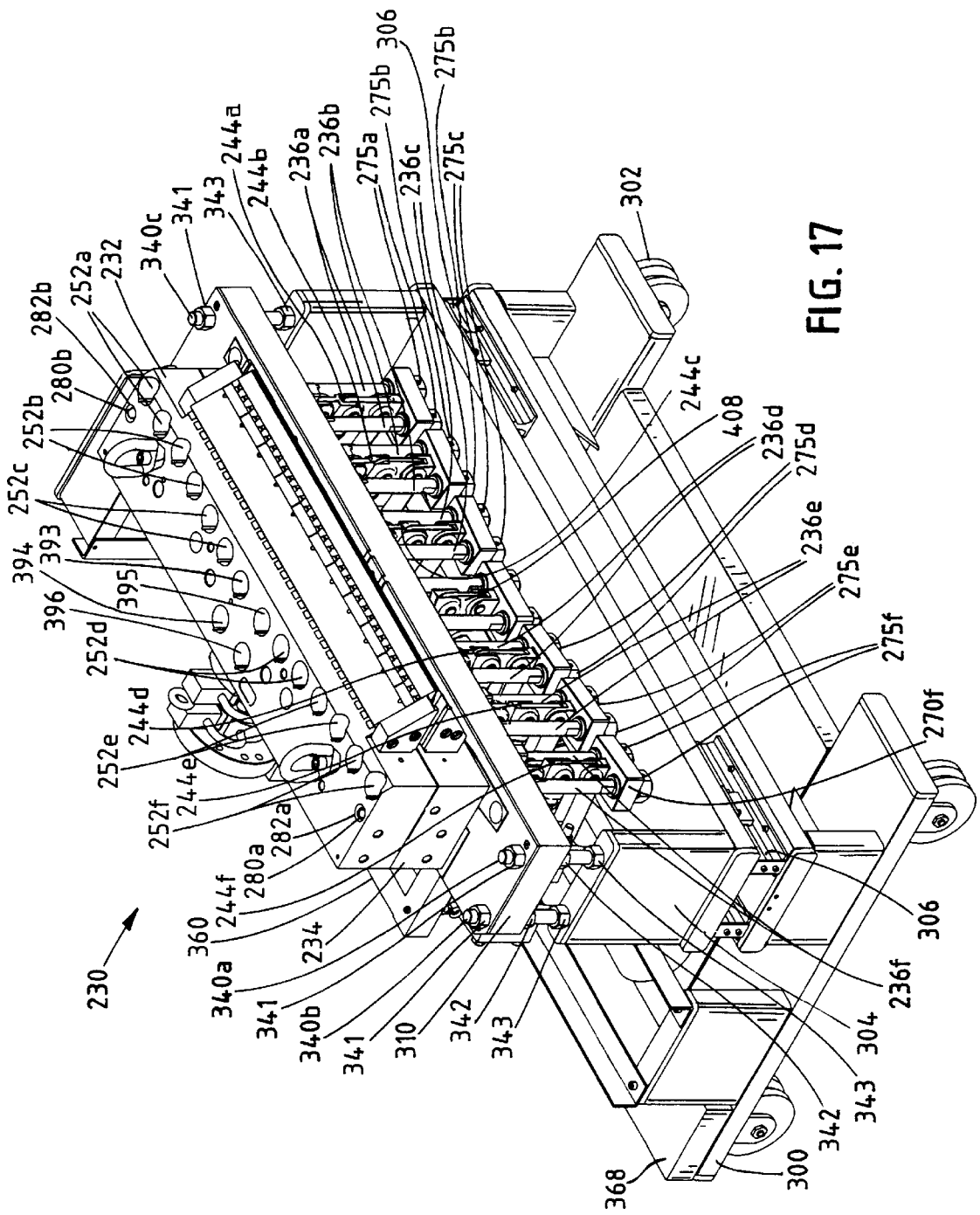
FIG. 17 is a front isometric view of the preferred embodiment of FIG. 15.

It should be evident from FIGS. 15 and 16 that each of the plurality of clamping rods 236a–236f is disposed adjacent a manifold back line 380 of the die 230. This is because clamping pressure is needed most at such areas. In the preferred embodiment, the apparatus further includes an offset toggling clamp 390 to provide clamping pressure on either side of an inlet 391.

The offset toggling clamp 390 includes four rods 392a–392d, each rod extending through each of first through fourth passages 393, 394, 395, 396, respectively, disposed through the first die body portion 232. Each of the rods 392a–392d also extends through passages (not shown) in the second die body portion 234 wherein each passage in the second die body portion is identical to each of the passages 54-1, 54-2. Each of the first through fourth rods 392a–392d is identical to each of the rods 36, 38 and each of the first through fourth passages 393–396 is identical to each of the passages 52-1, 52-2. The offset toggling clamp 390 further includes a pair of yokes 402a and 402b (each identical to the mounting member 116) and first through fourth nuts 403a–403d, respectively, wherein each of the nuts 403a–403d is threaded onto threaded end portions of the rods 392a–392d and wherein each of the nuts 403a–403d includes a set screw (not shown) disposed therein identical to each of the set screws 140a, 140b. The nuts 403a–403d capture the yokes 402a and 402b between the nuts 403a–403d and shouldered portions 406 (seen in FIG. 24) of the rods 392a–392d wherein the portions 406 are identical to the shouldered portions 142a, 142b described above. The rods 392a–392d and the nuts 403a–403d are freely rotatable such that the rods 392a–392d can rotate within the bores of the yokes 402a and 402b, similar to the embodiment of FIGS. 1–14 described above.

The offset toggling clamp 390 further includes an offset toggling linkage 408. The linkage 408 includes first though fourth bushings 410a–410d, each of which is identical to each of the bushings 86, 88. In the embodiment of FIGS. 15–23, however, each of the bushings 410a–410d is mounted to the platen 310 by screws 411. The linkage 408 further includes a first mounting member 412 that includes a bearing member 413 mounted to the platen 310 by threaded bolts 414. The linkage 408 further includes the offset actuator 379 identical to the actuator 46.

Referring now to FIG. 18, the toggling linkage 408 is shown with the first and second rods 392a, 392b and the first and second nuts 403a, 403b removed to reveal the linkage 408. The linkage 408 includes eight articulatable joints 425a–425h.

Figure 21:
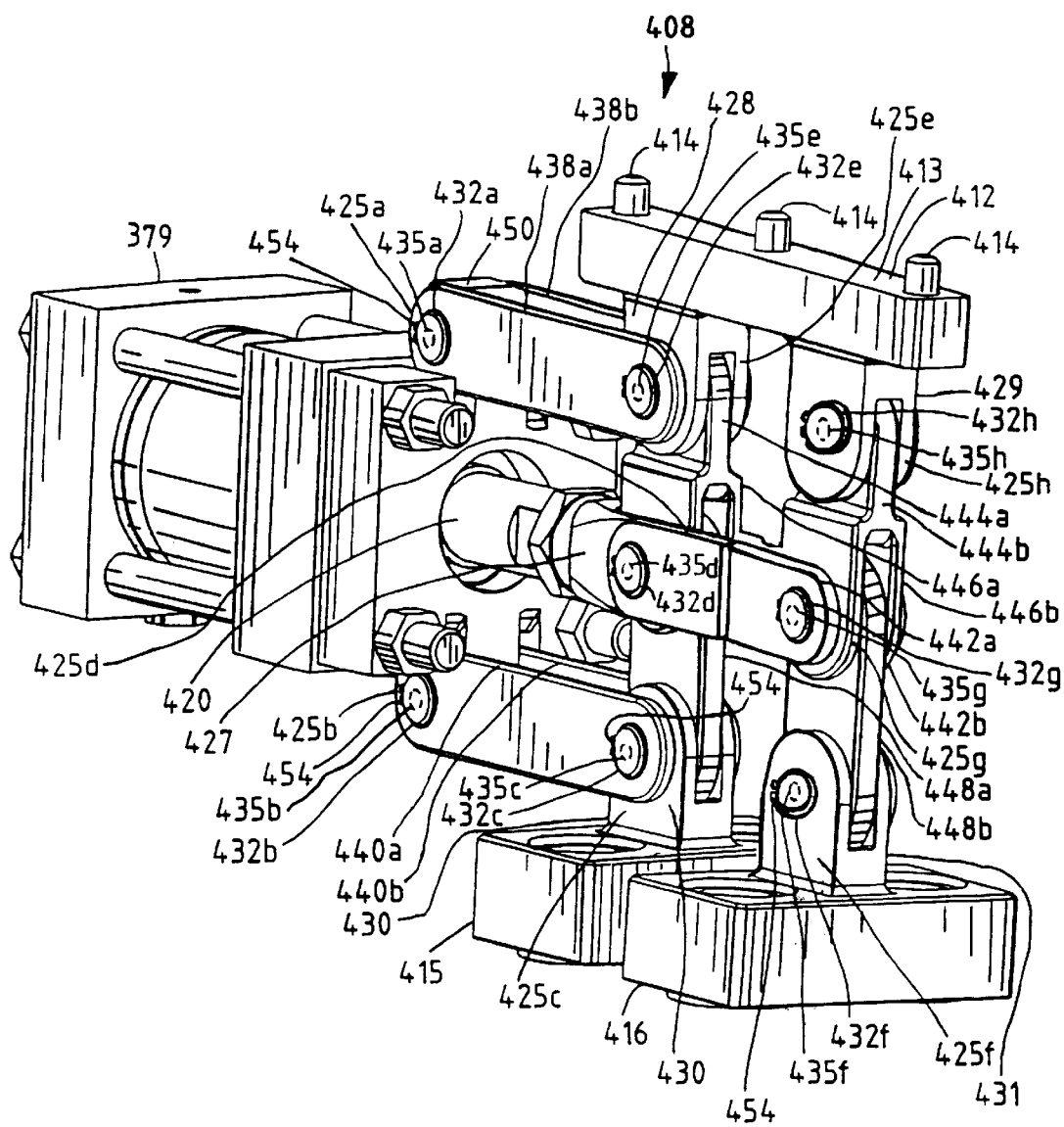
FIG. 21 is an enlarged fragmentary isometric view of the offset toggling clamps of FIG. 18 with portions removed.

Referring next to FIG. 21, the toggling linkage 408 includes a piston clevis 427 that is identical to piston clevis 108. First and second platen devises 428, 429, respectively, extend from the first mounting member 412. A first yoke clevis 430 extends from the yoke 402a and a second yoke clevis 431 extends from the yoke 402b.

The joints 425a–425h include eight rotatable axles 432a–432h that are retained in mated bores 435a–435h, respectively. The mated bores 435 extend through a pair of outer arms 438a, 438b, a second pair of outer arms 440a, 440b, a pair of piston extension arms 442a, 442b, the first and second platen devises 428, 429, first and second inner arms 444a, 444b, first and second inner devises 446a, 446b that are integral with the inner arms 44, first and second yoke arms 448a, 448b and the first and second yoke devises 430, 431. The first axle 432a extends further through a bore in a first actuator lug 450 of the offset actuator 379. The second axle 432b extends further through a bore in a second actuator lug 452. The axles 432a–432h are retained in the mated bores 435a–435h by a plurality of snap rings 454 disposed on each end of the axle 432a–432h, similar to the embodiment described above. In principle, the toggling linkage 408 works in similar manner to the linkage 44. Extension of a piston rod 456 (identical to the piston rod 128) of the actuator 379 causes the yokes 402a and 402b to move downwardly relative to the die body portions 232, 234. During this travel, the yokes 402a and 402b cause the rods 392a–392d to translate axially. In addition, stationary pins 458 disposed in the first through fourth bushings 410a–410d (two of which are shown in FIG. 24) cause rotation of the rods 392a–392d in the manner described in the above embodiment.

The operation of the apparatus illustrated in FIGS. 15–23 will now be described under the assumption that the piston rods of each of the actuators 246a–246f and 379 are all retracted such the rods 236a–236f and 392a–392d are all in the up position and the first die body portion 232 is removed from the second die body portion 234. Thereafter, the first die body portion 232 is lifted into position above the second die body portion 234 such that the rods 236a–236f are aligned with the passages 252a–252f and the rods 392a–392d are aligned with the passages 393–396. Lifting apparatus (not shown) may be employed for this purpose as in the previous embodiment. Once this alignment is complete, the lifting apparatus may be operated to lower the first die body portion 232 onto the second die body portion 234 until the rods 236a–236f and 392a–392d extend fully through the passages 252a–252f and the passages 393–396, respectively, and the first die body portion 232 rests fully on the second die body portion 234. At this point, an operator may actuate a switch 460 on a control panel 462, whereupon hydraulic or pneumatic pressures are supplied to the actuators 246a–246f and 379 to cause the actuators to extend the piston rods thereof. At this point, the clamping rods 236a–236f and 392a–392d are moved downwardly into engagement with each of a plurality of lands (not shown but identical to the lands 66) in each of the passages 252a–252f and in each of the passages 393–396 in the first die body portion 232 and clamping forces are developed to clamp the first die body portion 232 against the second die body portion 234. In addition, fluid pressures are simultaneously supplied to the actuator 379 to cause the piston rod thereof to extend. As seen in FIGS. 18, 21 and 24, this extension causes articulatable joints 425d and 425g to move away from the actuator 379, in turn causing outward pivoting of the arms 438a and 438b about the axles 432a and 432b. In addition, the first inner arm 444a and the first yoke arm 448a assume a substantially aligned position with respect to the rods 392a–392d, as do the second inner arm 444b and the second yoke arm 448b. Such movement, in turn, causes the rods 392a–392d to move downwardly relative to the die body portions 232 and 234. As noted above the pins 458 (only two of which are visible in FIG. 24) are disposed in corresponding bores in the bushings 410a–410d and further extend into slots or grooves that are formed in the rods 392a–392d. During downward movement of the rods 392a–392d, the rods 392a–392d rotate such that splines thereof move into interfering engagement with lands (not shown) in the first die body portion 232.

From the foregoing, it can be seen that uniform clamping pressures are applied by the rods and 392a–392d as well as the rods 236a–236f.

Thereafter, when it is desired to remove the first die body portion 232 from the second die body portion 234 the operator operates the switch 460 of the control panel 462 to reverse the fluid pressures applied across the actuators 246a–246f and 379, thereby causing the actuator piston rods to retract. This action, in turn, causes the rods 236a–236f and 392a–392d to move upwardly and rotate such that splines 463 of the rods 236 and 392 are in alignment with the grooves (not shown) in the first die body portion 232 so that the first die body portion 232 can be lifted off of the lower die body portion 234.

During operation of the actuators 246a–246f and 379, some movement of the actuators relative to the cart 300 occurs. This movement is accommodated by the suspension of the actuators 246a–246f and 379 from the support beam 360 by the springs 376a–376g.

Figure 23:
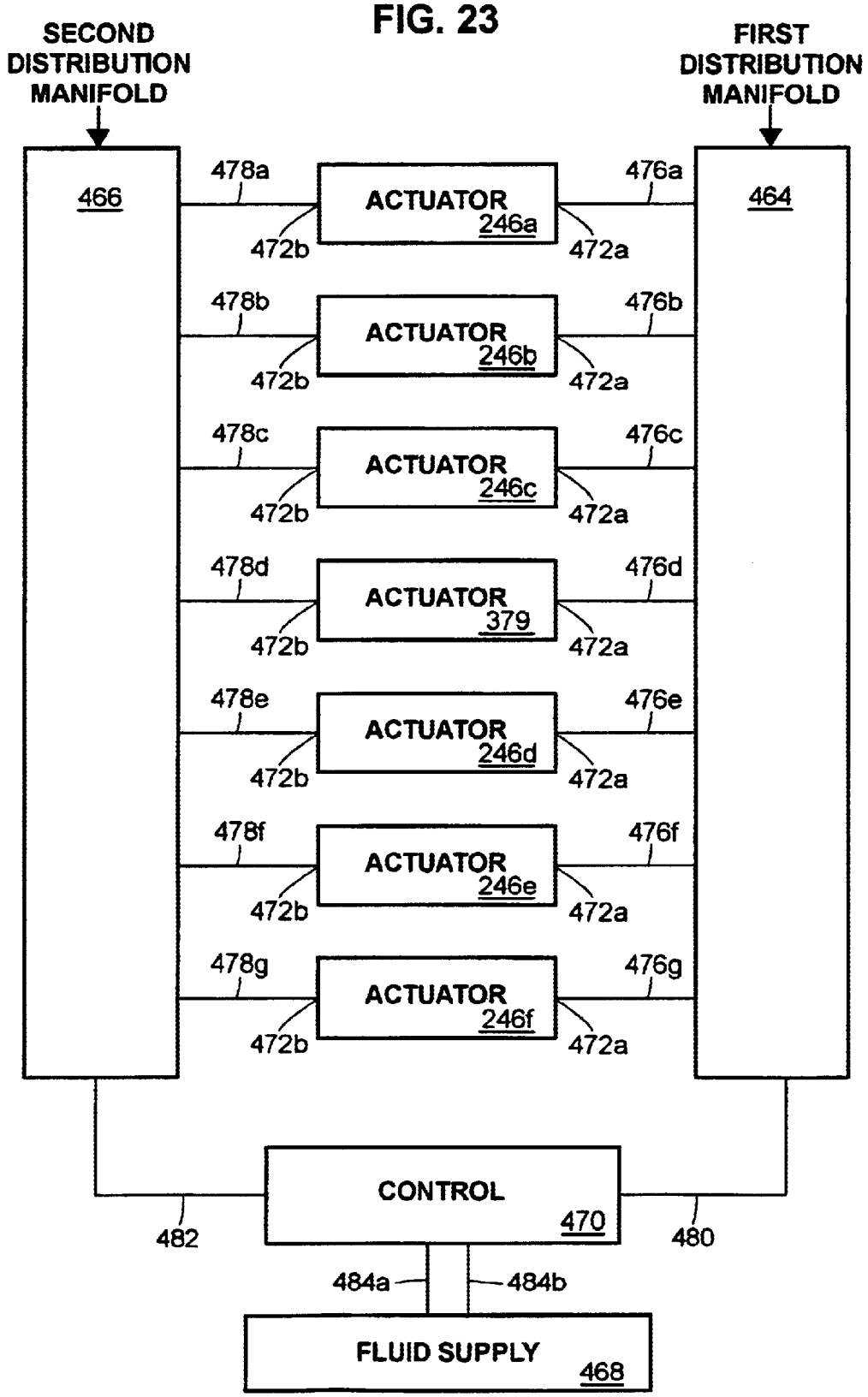
FIG. 23 is a block diagram of a hydraulic apparatus for controlling the actuators of FIG. 16.

As noted above, the switch 460 of the control panel 462 controls the direction of actuation of the actuators 246a–246f and 379. As seen in FIG. 19, a pair of distribution manifolds 464, 466 are disposed upon a rear portion of the cart 300. Each of the manifolds 464, 466 is connected to a fluid supply source 468 by a control 470. Referring also to FIG. 23, each of the actuators 246a–246f and 379 includes first and second fluid supply ports 472a and 472b wherein the first ports 472a are coupled by a first set of fluid conduits 476a–476g to the first manifold 464 and wherein the second ports 472b are coupled by a second set of fluid conduits 478a–478g to the second manifold 466. A third fluid conduit 480 connects the control 470 to the first manifold 464, and a fourth fluid conduit 482 connects the control 470 to the second manifold 466. Fifth and sixth fluid conduits, 484a, 484b, respectively, (seen in FIG. 23) connect the control 470 to the fluid supply source 468. The control 470 selectively supplies high and low pressure fluid to the manifolds 464, 466 from the source 468. High pressure fluid supply to the manifold 464 and low pressure fluid supply to the manifold 466 results in actuation that clamps the die body portions 232, 234 together. Conversely, high pressure fluid supply to the manifold 466 and low pressure fluid supply to the manifold 464 results in unclamping of the die body portions 232, 234. The manifolds 464, 466 distribute fluid to ensure that substantially equal clamping or unclamping forces are developed by the rods 236a–236f and 392a–392d.

While the foregoing description discloses a pair of die body portions and a particular number of actuators together with a like number of toggling linkages, it should be noted that more than two die body portions could instead be clamped together and/or a different number of identical or different actuators with a like or different number of toggling linkages could instead be used.

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

We claim:

1. An extrusion die, comprising:

a pair of die body portions that together define flow passages, an outlet, and a manifold back line disposed upstream of the outlet; and toggle clamps that clamp the die body portions together;

wherein the toggle clamps clamp the die body portions along the manifold back line.

2. The die of claim 1, further comprising a frame that holds one of the die body portions.

3. The die of claim 1, wherein the toggle clamps include first and second clamping rods disposed in first and second sets of passages in the die body portions, respectively.

4. The die of claim 1, wherein the toggle clamps are fluid actuated.

5. The die of claim 1, wherein the toggle clamps include first and second clamping rods disposed in first and second sets of passages in the die body portions, respectively, wherein the rods include a first plurality of splines adapted to engage a second plurality of spaced lands when the clamping rods are in the clamped position.

6. The die of claim 1, wherein the toggle clamps include clamping rods each having a slot, the toggle clamps further including a stationary pin disposed in the slot wherein the slot has a circumferential and axial extent such that the clamping rod is rotated a predetermined amount by the pin when the clamping rod is moved toward the clamping position.

7. The die of claim 1, further comprising a movable cart on which the extrusion die is mounted.

8. The die of claim 1, further comprising a movable cart, a die support coupled to the cart by a plurality of slides and an adjustable plate supporting one of the die body portions and coupled to the die support by adjustment apparatus.

9. An extrusion die, comprising:

first and second die body portions that define flow passages when the first and second die body portions are assembled together, an outlet, and a manifold back line disposed upstream of the outlet;

a frame that holds one of the die body portions;

first and second clamping rods disposed in first and second sets of passages in the die body portions, respectively;

a toggling apparatus coupled to the clamping rods; and an actuator coupled to the toggling apparatus and operable with the toggling apparatus to move the clamping rods to a clamping position clamping the die body portions together along the manifold back line.

10. The die of claim 9, further comprising first and second alignment pins that align the die body portions.

11. The die of claim 9, further comprising a first plurality of clamping rods disposed in a second plurality of sets of passages in the die body portions, a third plurality of toggling linkages coupled to the clamping rods and a fourth plurality of actuators, wherein each actuator is coupled to each toggling linkage.

12. The die of claim 9, wherein the actuator is fluid actuated.

13. The die of claim 9, wherein the rods have a first plurality of splines adapted to engage a second plurality of spaced lands carried by one of the die body portions when the clamping rods are in the clamped position.

14. The die of claim 9, wherein each rod has a slot and further including a stationary pin disposed in the slot wherein the slot has a circumferential and axial extent such that the clamping rod is rotated a predetermined amount by the pin when the clamping rod is moved toward the clamping position.

15. The die of claim 9, further comprising a movable cart on which the extrusion die is mounted.

16. The die of claim 9, further comprising a movable cart, a die support coupled to the cart by a plurality of slides and an adjustable plate supporting one of the die body portions and coupled to the support by adjustment apparatus.

17. An extrusion die, comprising:

first and second die body portions that together define flow passages, an outlet and a manifold back line disposed upstream of the outlet;

a frame that holds one of the die body portions;

toggle clamps having a first plurality of clamping rods disposed in a second plurality of sets of passages in the die body portions, a third plurality of toggling linkages coupled to the first plurality of clamping rods and a fourth plurality of actuators coupled to the third plurality of toggling linkages and operable therewith to move the clamping rods to a clamping position clamping the die body portions together along the manifold back line; and first and second alignment pins that align the die body portions.

18. The die of claim 17, wherein the toggle clamps are fluid actuated.

19. The die of claim 18, wherein the toggle clamps include first and second clamping rods disposed in first and second sets of passages in the die body portions, respectively, wherein the rods include a plurality of splines adapted to engage a second plurality of spaced lands carried by one of the die body portions when the clamping rods are in the clamped position.

20. The die of claim 18, wherein the toggle clamps include clamping rods, each rod having a slot, and further including a stationary pin disposed in the slot wherein the slot has a circumferential and axial extent such that the clamping rod is rotated a predetermined amount by the pin when the clamping rod is moved toward the clamping position.

21. The die of claim 20, further comprising a movable cart on which the extrusion die is mounted.

22. The die of claim 20, further comprising a movable cart, a die support coupled to the cart by a plurality of slides and an adjustable plate supporting one of the die body portions and coupled to the support by adjustment apparatus.

23. An extrusion die, comprising:

a pair of die body halves that are linearly movable together to define flow passages, an inlet, and an outlet; and toggle clamps that clamp the die body portions together, wherein the die body halves together define a manifold back line disposed upstream of an outlet and wherein the toggle clamps clamp along the manifold back line.

24. The die of claim 23, wherein clamping occurs in more than two locations along the manifold back line.

25. The die of claim 23, wherein the clamps are fluidically actuated.

26. The die of claim 23, wherein the toggle clamps include first and second clamping rods disposed in first and second sets of passages in the die body halves, respectively.

* * * * *